United States Patent
Izaki et al.

(10) Patent No.: US 11,175,662 B2
(45) Date of Patent: Nov. 16, 2021

(54) TRAVEL PLAN CORRECTION DEVICE AND TRAVEL PLAN CORRECTION METHOD

(71) Applicant: MITSUBISHI ELECTRIC CORPORATION, Tokyo (JP)

(72) Inventors: Kimihiko Izaki, Tokyo (JP); Mitsuo Shimotani, Tokyo (JP); Yoshitaka Nakamura, Tokyo (JP); Yoshinori Ueno, Tokyo (JP); Tadashi Miyahara, Tokyo (JP); Naohiko Obata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 218 days.

(21) Appl. No.: 16/475,436

(22) PCT Filed: Feb. 20, 2017

(86) PCT No.: PCT/JP2017/006157
§ 371 (c)(1),
(2) Date: Jul. 2, 2019

(87) PCT Pub. No.: WO2018/150580
PCT Pub. Date: Aug. 23, 2018

(65) Prior Publication Data
US 2019/0361442 A1    Nov. 28, 2019

(51) Int. Cl.
*G01C 22/00* (2006.01)
*G05D 1/00* (2006.01)
(Continued)

(52) U.S. Cl.
CPC ............ *G05D 1/0088* (2013.01); *B60K 35/00* (2013.01); *B60W 30/09* (2013.01);
(Continued)

(58) Field of Classification Search
CPC ............... G05D 1/0088; B60K 35/00; B60K 2370/175; B60W 30/09; B60W 30/0956;
(Continued)

(56) References Cited

U.S. PATENT DOCUMENTS

| 2008/0065328 A1 | 3/2008 | Eidehall et al. |
| 2009/0037088 A1 | 2/2009 | Taguchi |

(Continued)

FOREIGN PATENT DOCUMENTS

| JP | 2008-123197 A | 5/2008 |
| JP | 2009-37561 A | 2/2009 |

(Continued)

OTHER PUBLICATIONS

International Search Report, issued in PCT/JP2017/006157, PCT/ISA/210, dated May 23, 2017.

(Continued)

*Primary Examiner* — Mahmoud S Ismail
(74) *Attorney, Agent, or Firm* — Birch, Stewart, Kolasch & Birch, LLP.

(57) ABSTRACT

It is an object of the present invention to correct a travel plan of a vehicle so as to cause a self-vehicle to move to a relative position with lower travel risk. A travel plan correction device in accordance with the present invention includes a risk calculation section setting unit for setting a risk calculation section, a risk calculation unit for calculating a travel risk value, on the basis of a relative position between a target area and a surrounding vehicle and travel control information of the surrounding vehicle, a risk reduction section (Continued)

extraction unit for extracting a section whose travel risk value is lower than that at a traveling spot, out of the risk calculation section, as a risk reduction section, and a travel plan correction unit for correcting the travel plan so as to cause the self-vehicle to move to the risk reduction section.

16 Claims, 29 Drawing Sheets

(51) Int. Cl.
| | |
|---|---|
| *B60K 35/00* | (2006.01) |
| *B60W 30/09* | (2012.01) |
| *B60W 30/095* | (2012.01) |
| *B60W 50/14* | (2020.01) |
| *G06K 9/00* | (2006.01) |
| *G08G 1/16* | (2006.01) |

(52) U.S. Cl.
CPC ........ *B60W 30/0956* (2013.01); *B60W 50/14* (2013.01); *G06K 9/00825* (2013.01); *G08G 1/166* (2013.01); *B60K 2370/175* (2019.05); *B60W 2050/146* (2013.01); *B60W 2554/4041* (2020.02); *B60W 2554/801* (2020.02)

(58) Field of Classification Search
CPC ......... B60W 50/14; B60W 2554/4041; B60W 2554/801; B60W 2050/146; G06K 9/00825; G08G 1/166
USPC .......................................................... 701/23
See application file for complete search history.

(56) References Cited

U.S. PATENT DOCUMENTS

| | | | | |
|---|---|---|---|---|
| 2009/0326751 | A1* | 12/2009 | Otake | ....................... B60T 7/22 |
| | | | | 701/25 |
| 2010/0036578 | A1* | 2/2010 | Taguchi | ............. B60K 31/0008 |
| | | | | 701/93 |
| 2011/0137562 | A1* | 6/2011 | Taguchi | ............. G06K 9/00791 |
| | | | | 701/301 |
| 2017/0106750 | A1* | 4/2017 | Tauchi | ............... G02B 27/0101 |
| 2018/0058879 | A1* | 3/2018 | Tayama | ................ B60W 30/12 |
| 2018/0170259 | A1* | 6/2018 | Maejima | ................ H04N 7/181 |
| 2018/0170375 | A1* | 6/2018 | Jang | ....................... B60K 28/06 |

FOREIGN PATENT DOCUMENTS

| | | |
|---|---|---|
| JP | 2015-44432 A | 3/2015 |
| JP | 2015-197706 A | 11/2015 |
| JP | 2016-143091 A | 8/2016 |
| JP | 2016-182891 A | 10/2016 |

OTHER PUBLICATIONS

Office Action dated Dec. 3, 2019 in corresponding Japanese Application No. 2019-500159 with an English Translation.

* cited by examiner

FIG. 5
| SURROUNDING VEHICLE | TRAVEL RISK VALUE |
|---|---|
| MANUAL DRIVING (AHEAD IN THE SAME LANE) | 10 |
| MANUAL DRIVING (BEHIND IN THE SAME LANE) | 6 |
| MANUAL DRIVING (AHEAD IN ADJACENT LANE) | 2 |
| MANUAL DRIVING (BEHIND IN ADJACENT LANE) | 2 |
| AUTONOMOUS DRIVING | 0 |
FIG. 6
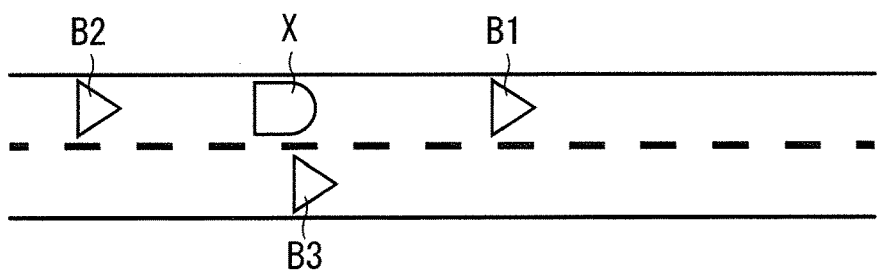
FIG. 7
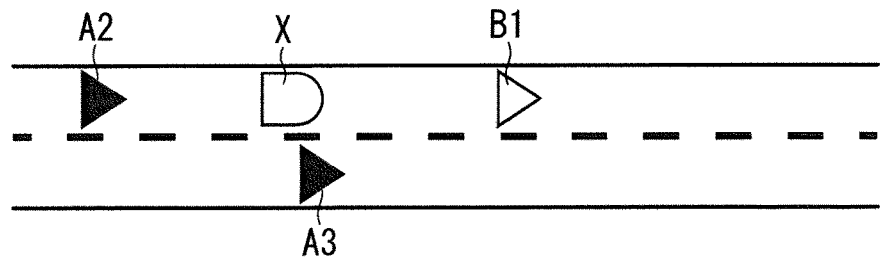
FIG. 8
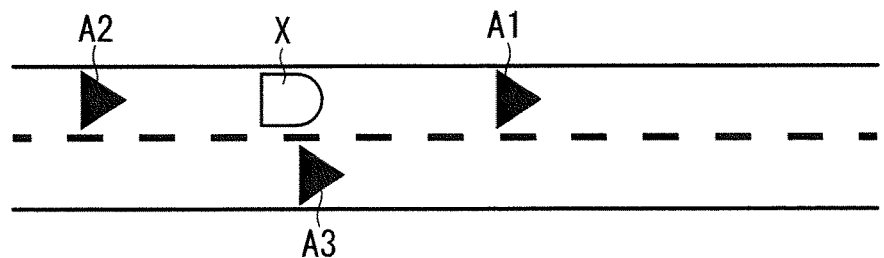

FIG. 12

| SURROUNDING VEHICLE | INTER-VEHICLE DISTANCE (m) | | | | |
|---|---|---|---|---|---|
| | 20 OR LESS | ~30 OR LESS | ~40 OR LESS | ~50 OR LESS | ~80 OR LESS |
| MANUAL DRIVING (AHEAD IN THE SAME LANE) | 10 | 8 | 6 | 4 | 2 |
| MANUAL DRIVING (BEHIND IN THE SAME LANE) | 6 | 4 | 3 | 0 | 0 |
| MANUAL DRIVING (AHEAD IN ADJACENT LANE) | 2 | 1 | 0 | 0 | 0 |
| MANUAL DRIVING (BEHIND IN ADJACENT LANE) | 2 | 1 | 0 | 0 | 0 |
| AUTONOMOUS DRIVING | 0 | 0 | 0 | 0 | 0 |

FIG. 46

| | TARGET SPOT | S1 | S2 | S3 | S4 | S5 | S6 | S7 | S8 | S9 |
|---|---|---|---|---|---|---|---|---|---|---|
| LEFT LANE | AHEAD IN THE SAME LANE | 2 | 10 | 10 | 0 | 0 | 10 | 0 | 0 | 0 |
| | BEHIND IN THE SAME LANE | 4 | 0 | 0 | 0 | 0 | 0 | 6 | 0 | 0 |
| | AHEAD IN ADJACENT LANE | 2 | 0 | 0 | 2 | 2 | 0 | 0 | 0 | 0 |
| | BEHIND IN ADJACENT LANE | 0 | 2 | 0 | 0 | 0 | 0 | 0 | 0 | 0 |
| | TRAVEL RISK VALUE R | ⑧ | 12 | 10 | ② | ② | 10 | 6 | 0 | 0 |
| RIGHT LANE | AHEAD IN THE SAME LANE | 10 | 0 | 0 | 10 | 6 | 0 | 0 | 0 | 0 |
| | BEHIND IN THE SAME LANE | 0 | 6 | 0 | 0 | 0 | 0 | 0 | 0 | 0 |
| | AHEAD IN ADJACENT LANE | 2 | 2 | 2 | 0 | 0 | 2 | 2 | 0 | 0 |
| | BEHIND IN ADJACENT LANE | 0 | 0 | 0 | 0 | 0 | 0 | 0 | 0 | 0 |
| | TRAVEL RISK VALUE R | 12 | ⑧ | ② | 10 | 6 | ② | ② | ⓪ | 0 |

TRAVEL PLAN CORRECTION DEVICE AND TRAVEL PLAN CORRECTION METHOD

TECHNICAL FIELD

The present invention relates to a technique for correcting a travel plan of a vehicle.

BACKGROUND ART

An autonomous driving system is a system in which control over at least some of actuators related to travel control of a vehicle is performed on the vehicle side, not by a person riding on the vehicle (a driver), and a very useful system by which the driving load of the person (driver) can be reduced.

When the driving algorithm of the autonomous driving system becomes more advanced, there are some cases where it is preferable that any vehicle with low autonomous driving level should not be present around a vehicle (hereinafter, referred to as an "autonomous driving vehicle") on which the autonomous driving system performs travel control. That is because a behavior of a vehicle with lower autonomous driving level becomes harder to predict. When a manual driving vehicle which is running ahead abruptly decelerates or abruptly cuts in from another lane, for example, an autonomous driving vehicle must inevitably also rapidly decelerate or perform quick steering in order to avoid the danger. As a result, in the autonomous driving system, the load of autonomous driving computation increases and the autonomous driving vehicle consumes energy for avoidance.

Patent Document 1 discloses an automatic follow-up traveling system which causes a self-vehicle to travel while following another vehicle. When this automatic follow-up traveling system detects that an autonomous driving vehicle is present in an adjacent lane while the self-vehicle follows a manual driving vehicle which is running ahead in the same lane, the automatic follow-up traveling system causes the self-vehicle to change the lane to the adjacent lane so as to travel while following the autonomous driving vehicle.

PRIOR ART DOCUMENTS

Patent Documents

Patent Document 1: Japanese Patent Application Laid Open Gazette No. 2015-44432

SUMMARY

Problem to be Solved by the Invention

In the automatic follow-up traveling system disclosed in Patent Document 1, however, once the self-vehicle travels while following a specific autonomous driving vehicle, the self-vehicle never moves from a relative position of the self-vehicle with respect to the other vehicle even when there is a better driving condition that fewer manual driving vehicles are present around the self-vehicle if the self-vehicle changes the lane after that.

The present invention is intended to solve the above-described problem, and it is an object of the present invention to correct a travel plan of a vehicle so as to cause a self-vehicle to move to a relative position with lower travel risk in terms of the relationship with other vehicles.

Means to Solve the Problem

The present invention is also intended for a travel plan correction device of a self-vehicle on which an autonomous driving control device performs travel control on the basis of a travel plan of the self-vehicle. According to the present invention, the travel plan correction device includes an information acquisition unit for acquiring a relative position of the self-vehicle with respect to a surrounding vehicle, travel control information of the surrounding vehicle, and the travel plan, a risk calculation section setting unit for setting a risk calculation section which has a certain relative positional relation with a traveling spot in a case where the self-vehicle travels along the travel plan and includes the traveling spot, a risk calculation unit for calculating a travel risk value indicating a risk at the time when the self-vehicle travels each of a plurality of target areas within the risk calculation section including the traveling spot, on the basis of a relative position between the target area and the surrounding vehicle and the travel control information of the surrounding vehicle, a risk reduction section extraction unit for extracting a section whose travel risk value is lower than that at the traveling spot, out of the risk calculation section, as a risk reduction section, and a travel plan correction unit for correcting the travel plan so as to cause the self-vehicle to move to the risk reduction section.

Effects of the Invention

The travel plan correction device according to the present invention includes a risk calculation section setting unit for setting a risk calculation section which has a certain relative positional relation with a traveling spot in a case where a self-vehicle travels along a travel plan and includes the traveling spot, a risk calculation unit for calculating a travel risk value indicating a risk at the time when the self-vehicle travels each of a plurality of target areas within the risk calculation section including the traveling spot, on the basis of a relative position between the target area and the surrounding vehicle and travel control information of the surrounding vehicle, a risk reduction section extraction unit for extracting a section whose travel risk value is lower than that at the traveling spot, out of the risk calculation section, as a risk reduction section, and a travel plan correction unit for correcting the travel plan so as to cause the self-vehicle to move to the risk reduction section. Therefore, according to the travel plan correction device of the present invention, it is possible to correct the travel plan of the vehicle so that the relative position of the self-vehicle with respect to the other vehicle can become a better condition.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a table showing a calculation rule for a travel risk value;

FIG. 6 is a view showing a positional relation between a self-vehicle and surrounding vehicles;

FIG. 7 is a view showing a positional relation between the self-vehicle and the surrounding vehicles;

FIG. 8 is a view showing a positional relation between the self-vehicle and the surrounding vehicles;

FIG. 12 is a table showing a calculation rule for the travel risk value;

FIG. 46 is a table showing respective travel risk values at the target spots shown in FIG. 43 for the right lane and the left lane;

DESCRIPTION OF EMBODIMENT(S)

A. The First Preferred Embodiment

A-1. Constitution

Figure 1:
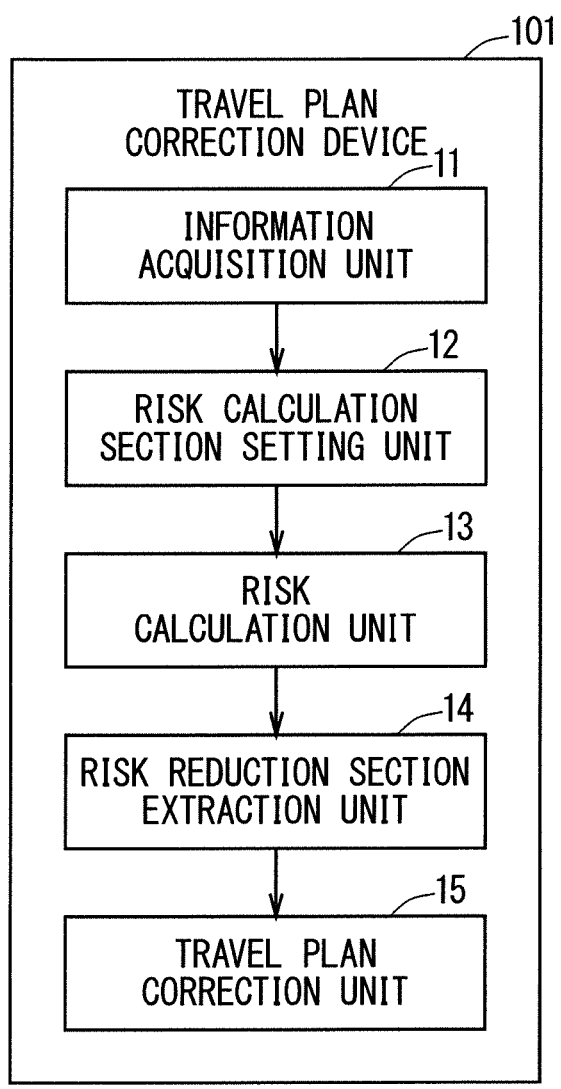
FIG. 1 is a block diagram showing a constitution of a travel plan correction device in accordance with a first preferred embodiment.

FIG. 1 is a block diagram showing a constitution of a travel plan correction device 101 in accordance with the first preferred embodiment of the present invention. The travel plan correction device 101 corrects a travel plan of a vehicle on which an autonomous driving control device (not shown in FIG. 1) performs travel control. In the present specification, a target vehicle whose travel plan is to be corrected by the travel plan correction device of the present invention will be referred to as a "self-vehicle". The travel plan correction device 101 performs travel control of a self-vehicle on the basis of the travel plan of the self-vehicle. In the present specification, description will be made assuming that the travel plan correction device is a device which is mounted on a self-vehicle, but this is only one exemplary case and various configurations can be assumed as described later in <E. Hardware Configuration>.

The travel plan correction device 101 comprises an information acquisition unit 11, a risk calculation section setting unit 12, a risk calculation unit 13, a risk reduction section extraction unit 14, and a travel plan correction unit 15.

The information acquisition unit 11 acquires a relative position of the self-vehicle with respect to a surrounding vehicle, travel control information of the surrounding vehicle, and the travel plan.

The risk calculation section setting unit 12 sets a risk calculation section. The risk calculation section is a section which has a certain relative positional relation with a traveling spot in a case where the self-vehicle travels along the travel plan and includes the traveling spot (hereinafter, referred to simply as a "travel-plan traveling spot") in the case where the self-vehicle travels along the travel plan.

The risk calculation unit 13 calculates a travel risk value indicating a risk at the time when the self-vehicle travels each of a plurality of target areas within the risk calculation section including the travel-plan traveling spot, on the basis of a relative position between the target area and the surrounding vehicle and the travel control information of the surrounding vehicle.

The risk reduction section extraction unit 14 extracts a section whose travel risk value is lower than that at the travel-plan traveling spot, out of the risk calculation section, as a risk reduction section.

The travel plan correction unit 15 corrects the travel plan so as to cause the self-vehicle to move to the risk reduction section.

A-2. Operation

Figure 2:
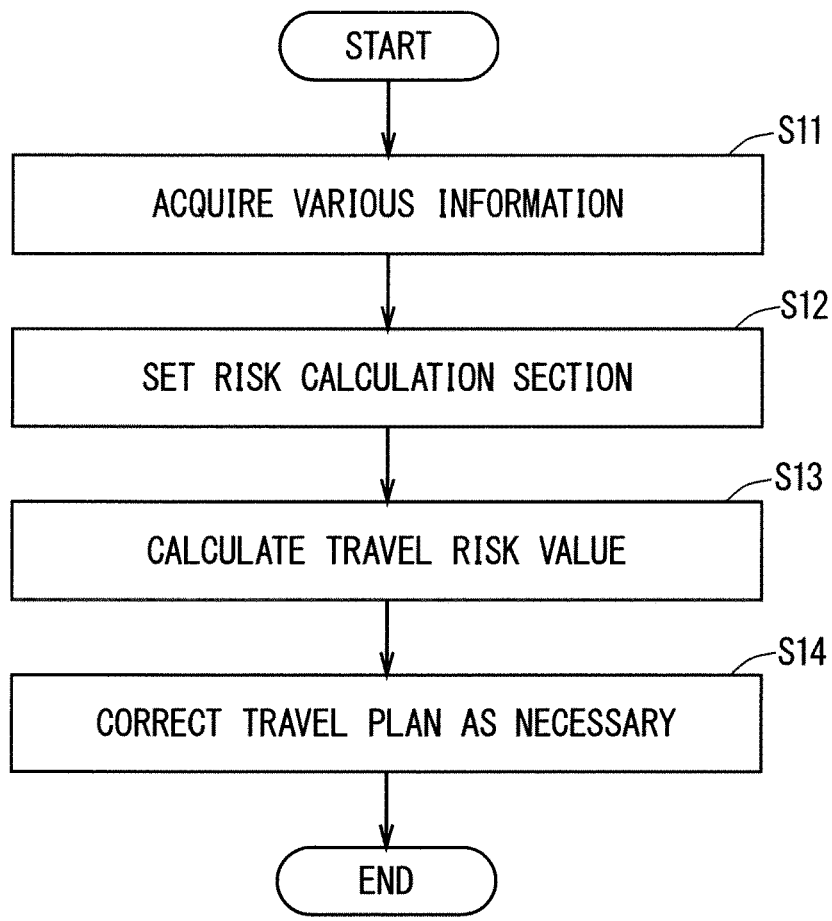
FIG. 2 is a flowchart showing a travel plan correction process performed by a travel plan correction device in accordance with first, second, or third preferred embodiment.

FIG. 2 is a flowchart showing a travel plan correction process performed by the travel plan correction device 101. Hereinafter, along the flowchart of FIG. 2, the travel plan correction process performed by the travel plan correction device 101 will be described.

First, the information acquisition unit 11 acquires various information, specifically the relative position of the self-vehicle with respect to the surrounding vehicle, the travel control information of the surrounding vehicle, and the travel plan (Step S11).

Next, the risk calculation section setting unit 12 sets the risk calculation section (Step S12). The risk calculation section is set as a section which has a certain relative positional relation with the travel-plan traveling spot and includes the travel-plan traveling spot.

Next, the risk calculation unit 13 calculates the travel risk value indicating a risk at the time when the self-vehicle travels each of a plurality of target areas within the risk calculation section, on the basis of the relative position between the target area and the surrounding vehicle and the travel control information of the surrounding vehicle (Step S13).

Figure 3:
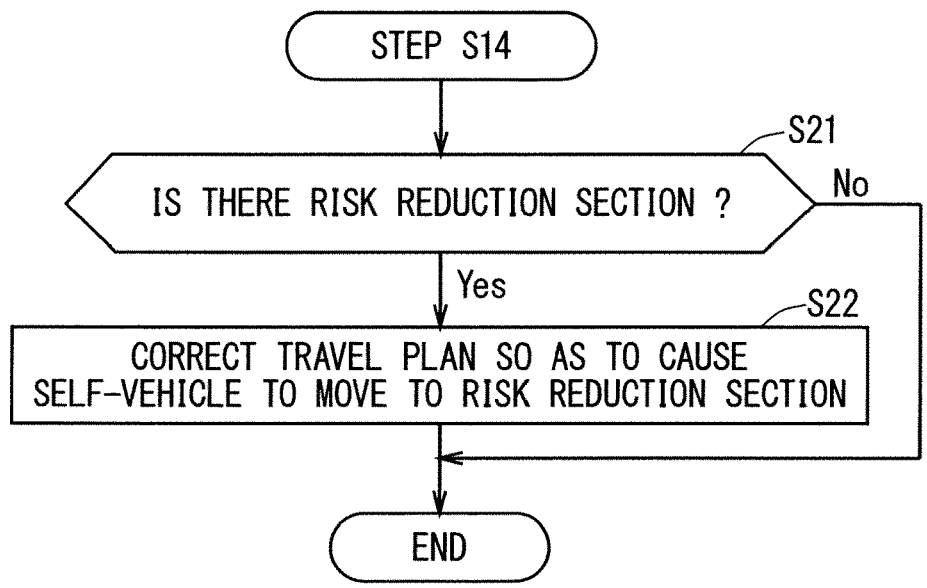
FIG. 3 is a flowchart showing details of Step S14 of FIG. 2 in the travel plan correction process performed by the travel plan correction device in accordance with the first preferred embodiment.

Next, the travel plan correction unit 15 corrects the travel plan as necessary (Step S14). A specific operation of this step is shown in FIG. 3. First, the risk reduction section extraction unit 14 determines whether there is a risk reduction section or not (Step S21). When there is a section whose travel risk value is lower than that at the travel-plan traveling spot in the risk calculation section, the risk reduction section extraction unit 14 extracts the section as the risk reduction section. When there is a risk reduction section, the travel plan correction unit 15 corrects the travel plan so as to cause the self-vehicle to move to the risk reduction section.

A-3. Effects

As described above, the travel plan correction device 101 in accordance with the first preferred embodiment of the present invention comprises the information acquisition unit 11, the risk calculation section setting unit 12, the risk calculation unit 13, the risk reduction section extraction unit 14, and the travel plan correction unit 15. The information acquisition unit 11 acquires the relative position of the self-vehicle with respect to a surrounding vehicle, the travel control information of the surrounding vehicle, and the travel plan. The risk calculation section setting unit 12 sets the risk calculation section which has a certain relative positional relation with the travel-plan traveling spot and includes the travel-plan traveling spot. The risk calculation unit 13 calculates the travel risk value indicating a risk at the time when the self-vehicle travels each of a plurality of target areas within the risk calculation section including the travel-plan traveling spot, on the basis of the relative position between the target area and the surrounding vehicle and the travel control information of the surrounding vehicle. The risk reduction section extraction unit 14 extracts a section whose travel risk value is lower than that at the travel-plan traveling spot, out of the risk calculation section, as the risk reduction section. The travel plan correction unit 15 corrects the travel plan so as to cause the self-vehicle to move to the risk reduction section. Therefore, according to the travel plan correction device 101, it is possible to correct the travel plan so that the self-vehicle can travel in a place with lower travel risk in terms of the relationship with the surrounding vehicles within the risk calculation section.

Further, according to a travel plan correction method of the first preferred embodiment of the present invention, the relative position of the self-vehicle with respect to a surrounding vehicle, the travel control information of the surrounding vehicle, and the travel plan are acquired, the risk calculation section which has a certain relative positional relation with the travel-plan traveling spot and includes the travel-plan traveling spot is set, the travel risk value indicating a risk at the time when the self-vehicle travels each of a plurality of target areas within the risk calculation section including the travel-plan traveling spot is calculated on the basis of the relative position between the target area and the surrounding vehicle and the travel control information of the surrounding vehicle, a section whose travel risk value is lower than that at the travel-plan traveling spot, out of the risk calculation section is extracted as the risk reduction section, and the travel plan is corrected so as to cause the self-vehicle to move to the risk reduction section.

B. The Second Preferred Embodiment

B-1. Constitution

Figure 4:
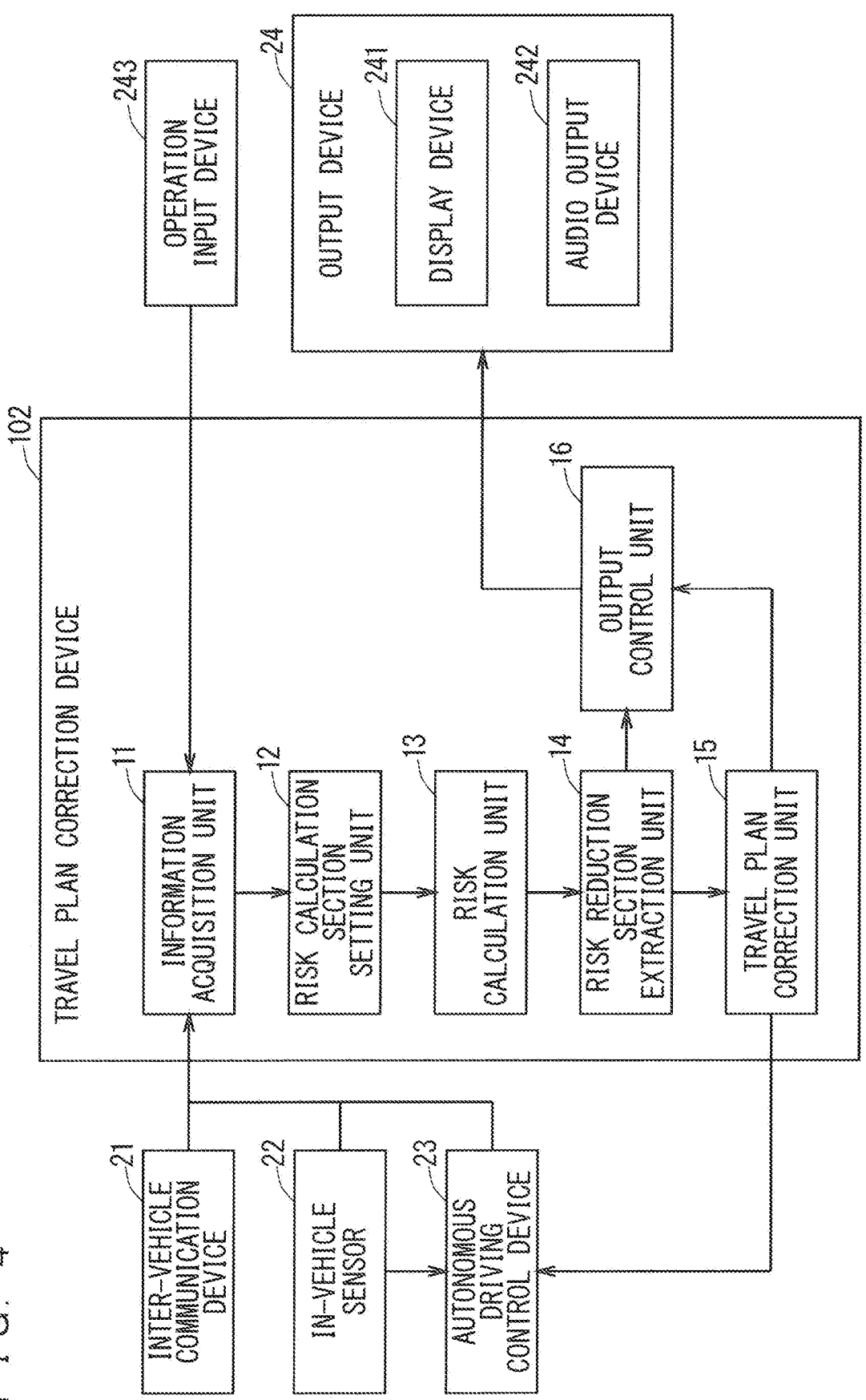
FIG. 4 is a block diagram showing a constitution of a travel plan correction device in accordance with a second preferred embodiment.

FIG. 4 is a block diagram showing a constitution of a travel plan correction device 102 in accordance with the second preferred embodiment of the present invention. The travel plan correction device 102 further comprises an output control unit 16 in addition to the constitution of the travel plan correction device 101 in accordance with the first preferred embodiment. Further, the travel plan correction device 102 is connected to an inter-vehicle communication device 21, an in-vehicle sensor 22, an autonomous driving control device 23, an output device 24, and an operation input device 243, and configured to use these devices. Though FIG. 4 shows the inter-vehicle communication device 21, the in-vehicle sensor 22, the autonomous driving control device 23, the output device 24, and the operation input device 243 as an external configuration of the travel plan correction device 102, these devices may be incorporated in the travel plan correction device 102.

The output control unit 16 controls an output from the output device 24.

The inter-vehicle communication device 21 is a device which performs an inter-vehicle communication with a vehicle running around the self-vehicle (hereinafter, referred to simply as a "surrounding vehicle"). The inter-vehicle communication device 21 acquires travel control information of a surrounding vehicle through the inter-vehicle communication. Herein, the "travel control information of a surrounding vehicle" acquired by the inter-vehicle communication device 21 is information which influences travel risk of the self-vehicle.

An example of the travel control information of the surrounding vehicle is information indicating whether the surrounding vehicle performs autonomous driving or manual driving. Since the surrounding vehicle performing manual driving is more likely to perform a behavior which cannot be predicted by the self-vehicle, such as an abrupt lane change or abrupt acceleration/deceleration, as compared with the surrounding vehicle performing autonomous driving, that is a factor to increase the travel risk of the self-vehicle.

Another example of the travel control information of the surrounding vehicle is information indicating an autonomous driving level in a case where the surrounding vehicle is an autonomous driving vehicle. Since the autonomous driving vehicle with lower autonomous driving level performs a behavior closer to that of the manual driving vehicle, that is a factor to increase the travel risk of the self-vehicle. The autonomous driving level is defined by the National Highway Traffic Safety Administration (NHTSA) of the Japanese Ministry of Transport or the United States Department of Transportation, from Level 0 to Level 4, and according to the definition, Level 0 corresponds to manual driving and Level 4 corresponds to full autonomous driving.

Still another example of the travel control information of the surrounding vehicle is control information on an steering actuator, a drive actuator, or a braking actuator of the surrounding vehicle. When the autonomous driving control device 23 can acquire these control information, the autonomous driving control device 23 can grasp the behavior of the surrounding vehicle on the basis of the control information and correct the travel plan on the basis of the behavior, to thereby reduce the travel risk of the self-vehicle.

Yet another example of the travel control information of the surrounding vehicle is information on a travel route of the surrounding vehicle. When the autonomous driving control device 23 can acquire the information on the travel route of the surrounding vehicle, the autonomous driving control device 23 can predict the behavior of the surrounding vehicle on the basis of the travel route of the surrounding vehicle and correct the travel plan in consideration of the behavior of the surrounding vehicle, to thereby reduce the travel risk of the self-vehicle.

The in-vehicle sensor 22 is a sensor which is mounted on the self-vehicle and detects information to measure relative position information between the surrounding vehicle and the self-vehicle. The in-vehicle sensor 22 includes, for example, a camera, a millimeter-wave radar, an ultrasonic sensor, and a laser radar. The information acquisition unit 11 acquires the relative position of the self-vehicle with respect to the surrounding vehicle on the basis of the detection information of the in-vehicle sensor 22 mounted on the self-vehicle.

The autonomous driving control device 23 has the travel plan of the self-vehicle and performs travel control on the self-vehicle on the basis of the travel plan. When the travel plan of the self-vehicle is corrected by the travel plan correction device 102, the autonomous driving control device 23 performs travel control on the self-vehicle on the basis of the corrected travel plan.

The output device 24 is a device for outputting information from the travel plan correction device 102 to a user, and comprises a display device 241 and an audio output device 242. This is, however, only one exemplary case but the output device 24 may comprise either one of the display device 241 and the audio output device 242. The display device 241 is, for example, a liquid crystal display, and the audio output device 242 is, for example, a speaker.

The operation input device 243 inputs an operation of the user who is a person riding on the self-vehicle, to the travel plan correction device 102. The operation input device 243 is, for example, a mechanical switch set in a package of the travel plan correction device 102. Alternatively, the operation input device 243 may be a touch screen which constitutes a touch panel, together with the display device 241.

B-2. Operation

Next, a travel plan correction process performed by the travel plan correction device 102 will be described. An overall flow of the travel plan correction process performed by the travel plan correction device 102 is the same as that shown in FIG. 2.

The information acquisition unit 11 acquires various information (Step S11), and then the risk calculation section setting unit 12 sets the risk calculation section (Step S12). The risk calculation section setting unit 12 sets the risk calculation section, for example, within a range where the in-vehicle sensor 22 can detect the relative position information between the surrounding vehicle and the self-vehicle (hereinafter, also referred to simply as "relative position information"). The risk calculation section is determined not as a section having an absolute position but as a section having a certain relative positional relation with a traveling spot $S1(t)$ at the time t while the self-vehicle is traveling along the travel plan. Specifically, the absolute position of the risk calculation section varies with the traveling spot S1 as time goes by. Further, as described later, since the risk calculation unit 13 calculates the travel risk value for each of target areas within the risk calculation section on the basis of the positional relation with the surrounding vehicle, the risk calculation section setting unit 12 may set the risk calculation section from a range where the surrounding vehicle whose relative position with the self-vehicle can be acquired by the information acquisition unit 11 using a sensor mounted on the self-vehicle is present.

Next, the risk calculation unit 13 calculates the travel risk value for each of a plurality of target areas within the risk calculation section (Step S13). The travel risk value is an index for the travel risk at the time when the self-vehicle travels the target area. The target area may be a spot, i.e., a target spot or may be a section having a certain range, i.e., a target section. In the present specification, the word of "target area" is used for a concept including the target spot and the target section. Hereinafter, description will be made on a case where the risk calculation unit 13 calculates the travel risk value at the target spot. The target spots may be set at regular intervals within the risk calculation section or may be set in terms of the relationship with the surrounding vehicles, such as being set densely in a section where the surrounding vehicles are present densely and being set sparsely in a section where the surrounding vehicles are present sparsely, or the like.

Hereinafter, a method of calculating the travel risk value by the risk calculation unit 13 will be described in detail. FIG. 5 shows a calculation rule for the travel risk value. In FIG. 5, the travel risk value assigned to the surrounding vehicle performing manual driving is higher than that assigned to the surrounding vehicle performing autonomous driving. Specifically, the travel risk value due to a manual driving vehicle running ahead of the self-vehicle in the same lane is 10, the travel risk value due to a manual driving vehicle running behind the self-vehicle in the same lane is 6, the travel risk value due to a manual driving vehicle running ahead of or behind the self-vehicle in an adjacent lane is 2, and the travel risk value due to an autonomous driving vehicle is 0.

FIG. 6 shows a state in which a manual driving vehicle B1 is running ahead of a self-vehicle X in the same lane, a manual driving vehicle B2 is running behind the self-vehicle X in the same lane, and a manual driving vehicle B3 is running ahead of the self-vehicle X in the adjacent lane. At that time, according to the rule of FIG. 5, the travel risk value of the self-vehicle X is 10 with respect to the manual driving vehicle B1, 6 with respect to the manual driving vehicle B2, and 2 with respect to the manual driving vehicle B3, and is totally 18.

FIG. 7 shows a state in which the vehicle running behind the self-vehicle X in the same lane is changed from the manual driving vehicle B2 to an autonomous driving vehicle A2 and the vehicle running ahead of the self-vehicle X in the adjacent lane is changed from the manual driving vehicle B3 to an autonomous driving vehicle A3, as compared with the state shown in FIG. 6. At that time, according to the rule of FIG. 5, the travel risk value of the self-vehicle X is 10 with respect to the manual driving vehicle B1 and 0 with respect to the autonomous driving vehicles A2 and A3, and is totally 10.

FIG. 8 shows a state in which the vehicle running ahead of the self-vehicle X in the same lane is changed from the manual driving vehicle B1 to an autonomous driving vehicle A1, as compared with the state shown in FIG. 7. At that time, according to the rule of FIG. 5, the travel risk value of the self-vehicle X is 0 with respect to the autonomous driving vehicles A1, A2 and A3.

Figure 9:
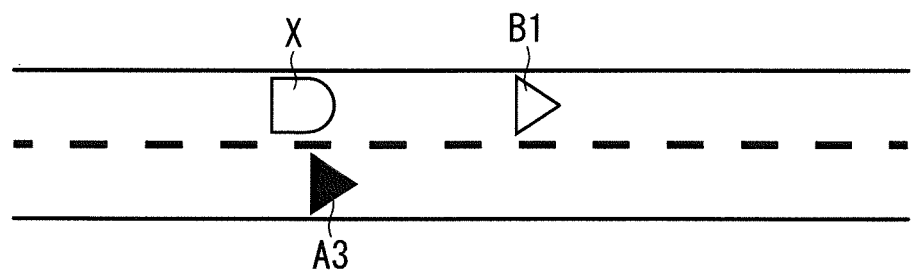
FIG. 9 is a view showing a positional relation between the self-vehicle and the surrounding vehicles.

FIG. 9 shows a state in which the manual driving vehicle B1 is running ahead of the self-vehicle X in the same lane and the autonomous driving vehicle A3 is running ahead of the self-vehicle X in the adjacent lane. At that time, according to the rule of FIG. 5, the travel risk value of the self-vehicle X is 10 with respect to the manual driving vehicle B1.

Figure 10:
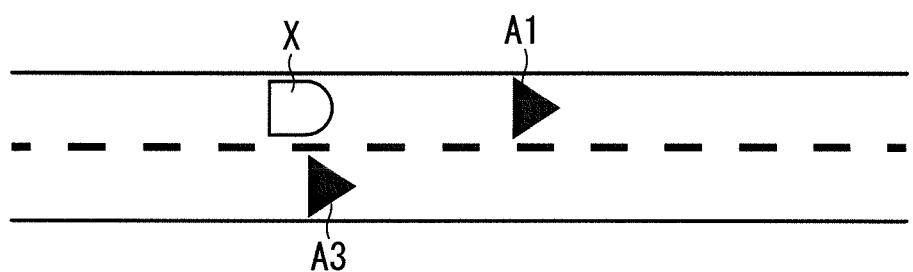
FIG. 10 is a view showing a positional relation between the self-vehicle and the surrounding vehicles.

FIG. 10 shows a state in which the vehicle running ahead of the self-vehicle X in the same lane is changed from the manual driving vehicle B1 to the autonomous driving vehicle A1, as compared with the state shown in FIG. 9. At that time, according to the rule of FIG. 5, the travel risk value of the self-vehicle X is 0.

Figure 11:
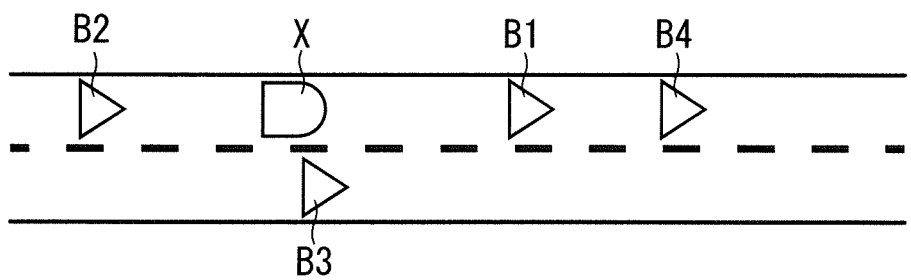
FIG. 11 is a view showing a positional relation between the self-vehicle and the surrounding vehicles.

FIG. 11 shows a state in which a manual driving vehicle B4 is running ahead of the manual driving vehicle B1, as compared with the state shown in FIG. 6. At that time, according to the rule of FIG. 5, the travel risk value of the self-vehicle X is 10 with respect to each of the manual driving vehicles B1 and B4, 6 with respect to the manual driving vehicle B2, and 2 with respect to the manual driving vehicle B3, and is totally 28.

Alternatively, the risk calculation unit 13 may not calculate the travel risk value with respect to the vehicle running two vehicles ahead of the self-vehicle X, i.e., the second manual driving vehicle B4 and may determine that the travel risk value of the self-vehicle X is 18 like in the state of FIG. 6.

Further, the risk calculation unit 13 may multiply the travel risk value according to the rule of FIG. 5 by an appropriate coefficient with respect to the second manual driving vehicle B4. When the coefficient is assumed to be 0.5, for example, the travel risk value of the self-vehicle X with respect to manual driving vehicle B4 is 10×0.5=5, and the total travel risk value of the self-vehicle X is 23. Furthermore, the above coefficient may be changed in accordance with the number of vehicles ahead of or behind the self-vehicle X. For example, with respect to the manual driving vehicles running ahead of the self-vehicle X in the same lane, the coefficients for the second and later vehicles may be assumed to be 0.5, 0.25, 0.1, 0.0, and with respect to the manual driving vehicles running ahead of the self-vehicle X in the adjacent lane, the coefficients for the second and later vehicles may be assumed to be 0.2, 0.1, 0.0. Thus, the coefficients for the second and later vehicles may be changed, depending on the driving lane of the surrounding vehicle or whether the vehicle is running ahead of or behind the self-vehicle.

In the above description, the travel risk value is calculated on the basis of the rule of FIG. 5. Though the travel risk value is determined, according to this rule, by whether the driving lane of the surrounding vehicle is the same as or different from that of the self-vehicle X and whether the surrounding vehicle is running ahead of or behind the self-vehicle X, the calculation rule for the travel risk value is not limited to the above rule but may be, for example, a calculation rule shown in FIG. 12. FIG. 12 shows a calculation rule indicating that the travel risk value becomes higher as the inter-vehicle distance between the surrounding vehicle and the self-vehicle X decreases, in addition to the rule of FIG. 5.

Further, in the calculation rules shown in FIGS. 5 and 12, the travel risk value is a discrete value, but may be a continuous value. Specifically, the risk calculation unit 13 may calculate the travel risk value by using such a calculation equation as to continuously change the travel risk value. The risk calculation unit 13 may use, for example, such a calculation equation as to exponentially increase the travel risk value as the inter-vehicle distance decreases.

The risk calculation unit 13 performs the above-described calculation of the travel risk value for all the target spots within the risk calculation section. In other words, the risk calculation unit 13 calculates the travel risk value in a case where the self-vehicle X travels each target spot within the risk calculation section.

Thus, the travel risk value calculation process performed by the risk calculation unit 13 has been described (Step S13 in FIG. 2). Next, the travel plan correction device 102 corrects the travel plan as necessary (Step S14). Since Step S14 of FIG. 2 in the travel plan correction process performed by the travel plan correction device 102 is different from the flow of the first preferred embodiment shown in FIG. 3, Step S14 will be described with reference to a flow shown in FIG. 13.

Figure 14:
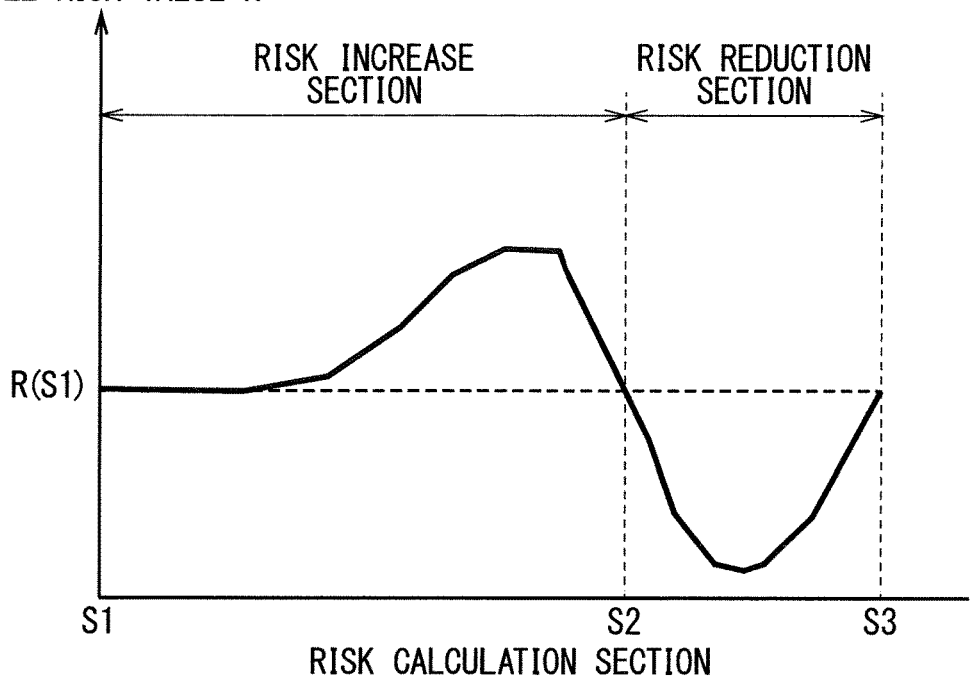
FIG. 14 is a graph showing a transition of a travel risk value R in a risk calculation section.

First, the risk reduction section extraction unit 14 determines whether or not there is a risk reduction section in the risk calculation section (Step S31). FIG. 14 shows a transition of a travel risk value R in the risk calculation section. The risk calculation section shown in FIG. 14 is a section from a traveling spot S1 to a target spot S3 in a case where the self-vehicle travels along the travel plan. Further, the traveling spot S1 is also a target spot. Furthermore, each of the target spots S2 and S3 is a spot where the travel risk value R is equal to a travel risk value R(S1) at the traveling spot S1.

The section from the traveling spot S1 to the target spot S2 is a risk increase section where the travel risk value R increases from the travel risk value R(S1) at the traveling spot S1. The section from the target spot S2 to the target spot S3 is a risk reduction section where the travel risk value R decreases from the travel risk value R(S1) at the traveling spot S1.

Further, in a case where the travel speed of the self-vehicle X according to the travel plan is different from that of the surrounding vehicle, the travel risk values R at the target spots S1, S2, and S3 which depend on the positional relation with the surrounding vehicle vary as time goes by. Therefore, the transition of the travel risk value R shown in FIG. 14 also varies as time goes by. In the present preferred embodiment, however, for simplification, description will be made assuming that the travel speed of the surrounding vehicle is the same as that of the self-vehicle X according to the travel plan.

If there is no risk reduction section in the risk calculation section, the travel plan correction process is finished. On the other hand, when there is a risk reduction section in the risk calculation section, the risk reduction section extraction unit 14 extracts the risk reduction section (Step S32 in FIG. 13).

Then, the travel plan correction device 102 notifies a user of the risk reduction section (Step S33). Herein, the output control unit 16 produces a presentation image of the risk reduction section and displays the image on the display device 241.

Figure 15:
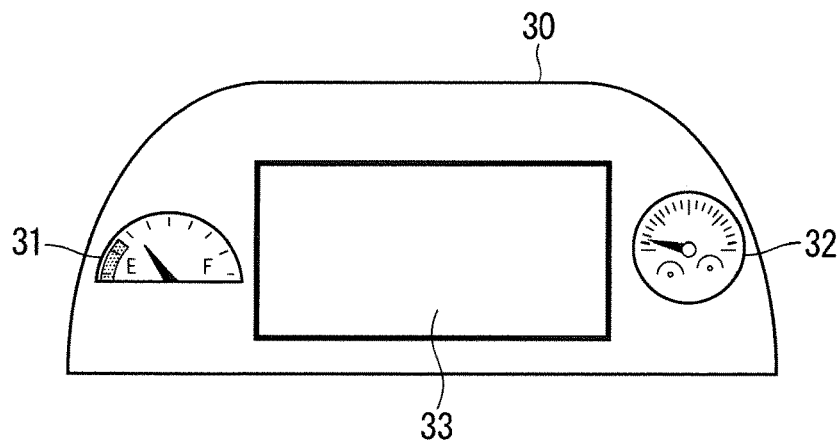
FIG. 15 is a view showing an instrument panel of the self-vehicle which is used as a display device.

A specific example of the presentation image of the risk reduction section will be shown below. FIG. 15 shows an instrument panel 30 of the self-vehicle which is used as the display device 241. The instrument panel 30 comprises a fuel indicator 31, a speed indicator 32, and a liquid crystal panel 33, and the presentation image of the risk reduction section is displayed on the liquid crystal panel 33.

Figure 13:
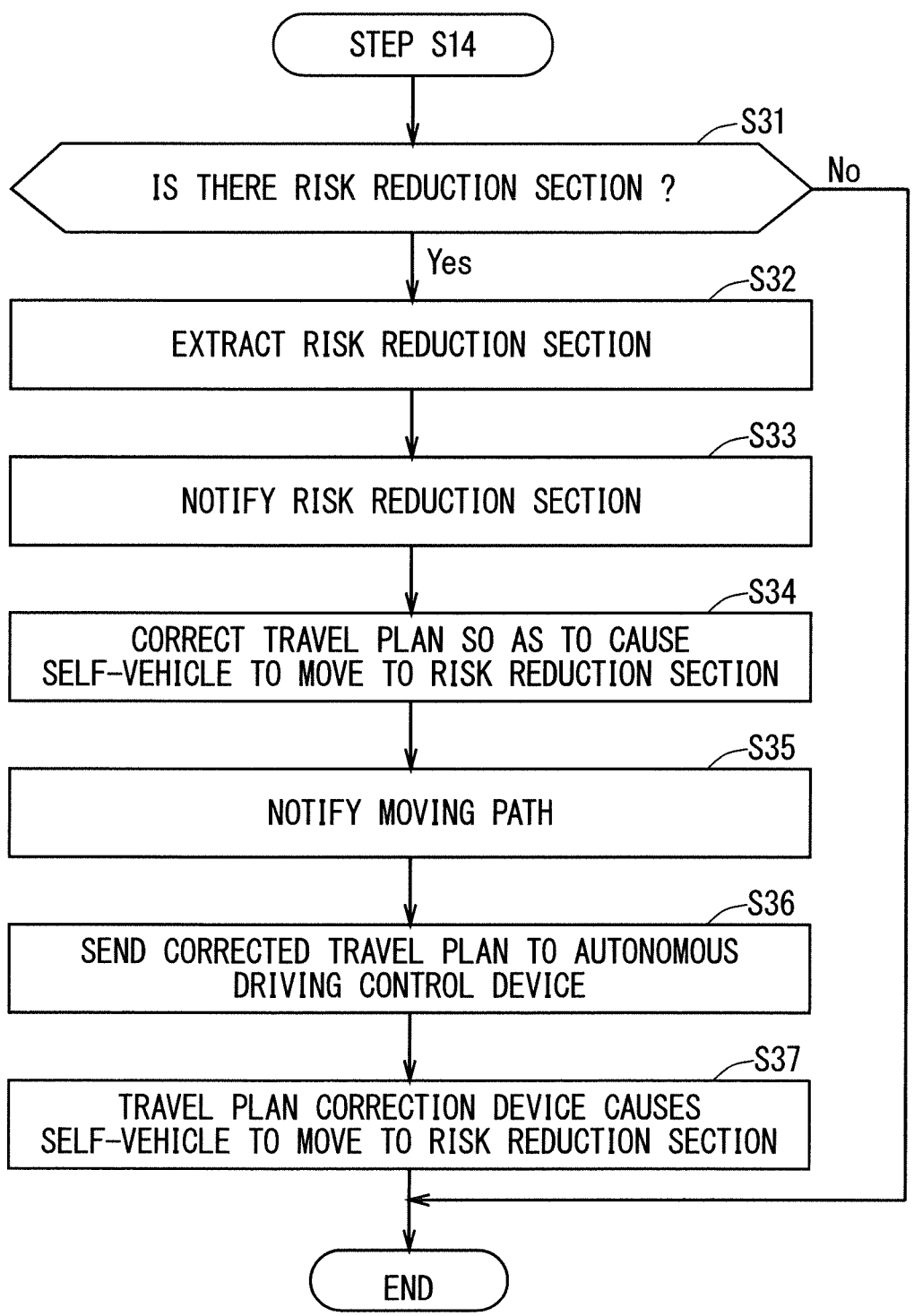
FIG. 13 is a flowchart showing details of Step S14 of FIG. 2 in the travel plan correction process performed by the travel plan correction device in accordance with the second preferred embodiment.
Figure 16:
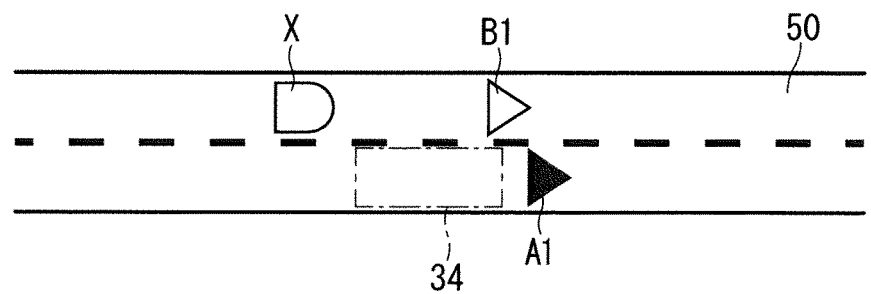
FIG. 16 is a notification image view of a risk reduction section.
Figure 17:
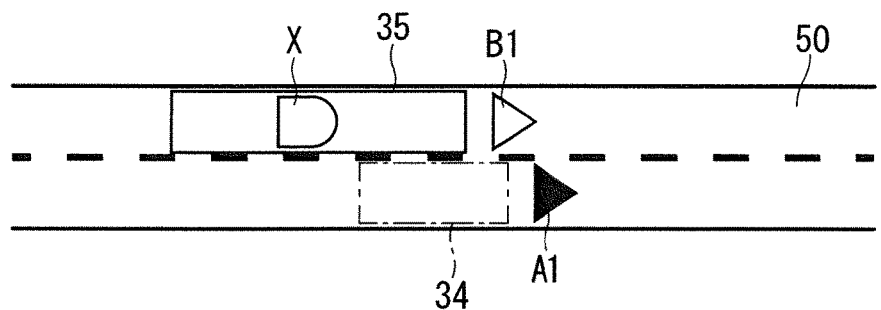
FIG. 17 is another notification image view of the risk reduction section.

FIGS. 16 and 17 each show the presentation image of the risk reduction section displayed on the liquid crystal panel 33 in Step S33 of FIG. 13. In these figures, the liquid crystal panel 33 is not shown.

The presentation image of FIG. 16 shows a positional relation between the self-vehicle X and the surrounding vehicle on a road image 50. Herein, it is assumed that the self-vehicle X is running behind the manual driving vehicle B1 in a left lane of a two-lane road and the autonomous driving vehicle A1 is running ahead of the self-vehicle X in a right lane. Further, an area behind the autonomous driving vehicle A1 in the right lane is surrounded by a one-dot chain line frame 34 that indicates the risk reduction section. The user can understand, from this presentation image, that the travel risk can be reduced by causing the self-vehicle X to move to the right lane.

Further, as shown in the presentation image of FIG. 17, there may be a case where an area including the current spot of the self-vehicle X is surrounded by a solid line frame 35 and the magnitude relation in the travel risk value between the area surrounded by the solid line frame 35 and the risk reduction section surrounded by the one-dot chain line frame 34 is thereby shown. Herein, the solid line frame 35 represents an area with higher travel risk and the one-dot chain line frame 34 represents an area with medium travel risk. With reference to FIGS. 16 and 17, the exemplary case has been described where the information indicating the magnitude relation in the travel risk value between the area including the current spot of the self-vehicle X and the risk reduction section is outputted to the user. The output control unit 16, however, has only to cause the output device 24 to output the information indicating at least whether there is a risk reduction section or not.

Next, the travel plan correction unit 15 corrects the travel plan so as to cause the self-vehicle X to move to the risk reduction section (Step S34).

Then, the travel plan correction device 102 notifies the user of the moving path of the self-vehicle X to the risk reduction section (Step S35). Herein, the output control unit 16 produces a notification image of the moving path of the self-vehicle X and displays this image on the display device 241.

Figure 18:
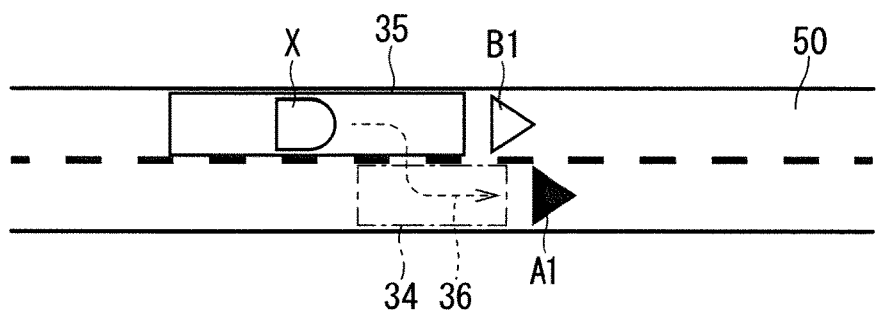
FIG. 18 is a notification image view of a moving path.

FIG. 18 shows an image displayed on the liquid crystal panel 33 in Step S35. In the image shown in FIG. 18, as compared with the image shown in FIG. 17, a moving path 36 of the self-vehicle X to the risk reduction section is represented by an arrow. From this image, the user can understand what path the self-vehicle X will use to move to the risk reduction section.

Next, the travel plan correction device 102 sends the travel plan corrected in Step S34 to the autonomous driving control device 23 (Step S36). The autonomous driving control device 23 causes the self-vehicle to move to the risk reduction section (Step S37), and the travel plan correction process is completed.

Figure 19:
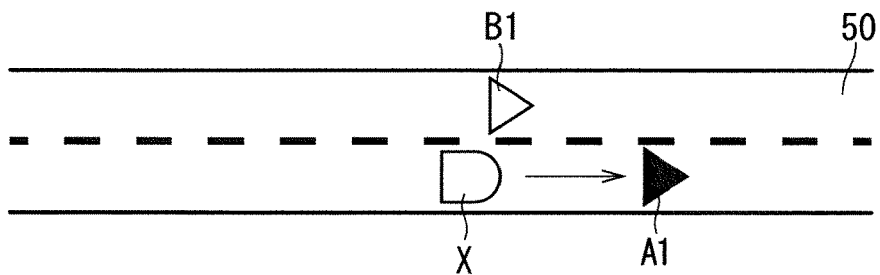
FIG. 19 is an image view showing a positional relation between the self-vehicle and the surrounding vehicles.

With reference to FIGS. 16 to 18, description has been made on the process where when the risk reduction section is extracted, the risk reduction section and the moving path of the self-vehicle X to the risk reduction section are displayed on the liquid crystal panel 33 (the display device 241), to thereby give the information to the user. Even when the risk reduction section is not extracted, however, the output control unit 16 may display such an image as shown in FIG. 19, indicating the positional relation between the self-vehicle X and the surrounding vehicles, on the display device 241. The image of FIG. 19 shows a state in which the self-vehicle X travels in the right lane of the two-lane road, following the autonomous driving vehicle A1 and the manual driving vehicle B1 travels ahead of the self-vehicle X in the left lane.

Figure 20:
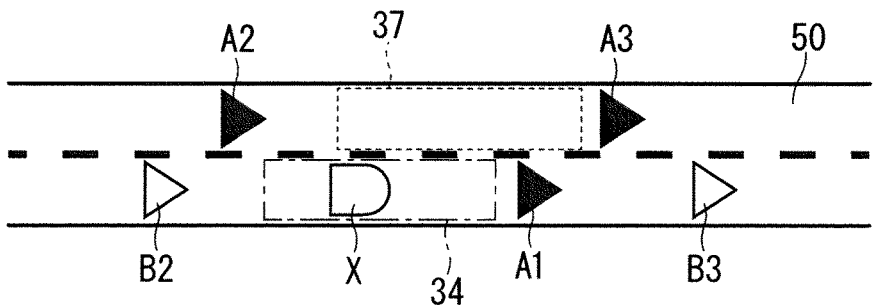
FIG. 20 is still another notification image view of the risk reduction section.

Further, after the self-vehicle X moves to the risk reduction section represented by the one-dot chain line frame 34 in FIG. 18, it is assumed that a new risk reduction section with lower travel risk value appears in the left lane. At that time, as shown in FIG. 20, the output control unit 16 displays a notification image of the new risk reduction section on the display device 241. In FIG. 20, the new risk reduction section is represented by a broken line frame 37, which shows that the travel risk value R for the new risk reduction section is lower than that for the section represented by the one-dot chain line frame 34.

The respective images of FIGS. 17, 18, and 20 each show the magnitude relation in the travel risk between the risk reduction section and the other section. The output control unit 16, however, may produce an image indicating the magnitude relation in the travel risk value R within the risk calculation section, regardless of the risk reduction section.

Figure 21:
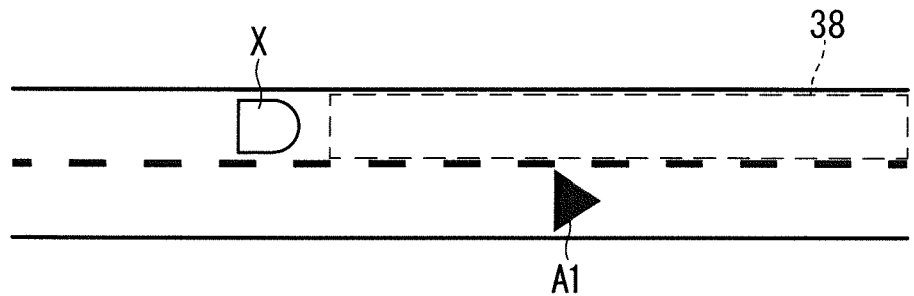
FIG. 21 is an image view showing a magnitude relation of travel risk in the risk calculation section.

For example, it is assumed that there is no other vehicle around the self-vehicle X running in the left lane. At that time, the output control unit 16 produces an image shown in FIG. 21. In this image, an area ahead of the self-vehicle X is surrounded by a broken line frame 38, which indicates that the travel risk value R is low.

Figure 22:
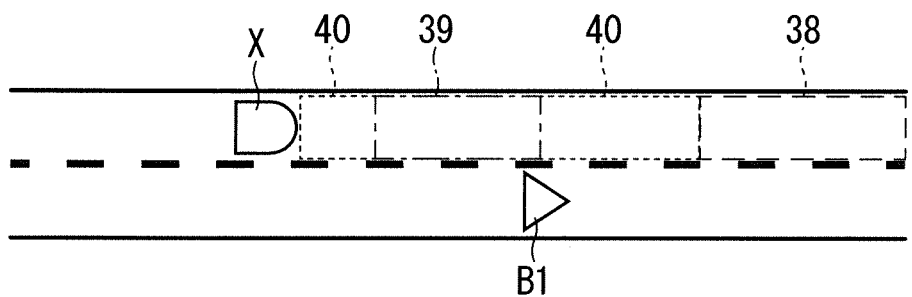
FIG. 22 is another image view showing a magnitude relation of the travel risk in the risk calculation section.

After that, it is assumed that the manual driving vehicle B1 appears ahead of the self-vehicle X in the right lane. At that time, the output control unit 16 produces an image shown in FIG. 22. In the image of FIG. 22, out of the area ahead of the self-vehicle X, an area diagonally left behind the manual driving vehicle B1, which is a blind spot from the manual driving vehicle B1, is surrounded by a one-dot chain line frame 39, which indicates that the travel risk value R is high. Further, areas ahead of and behind the area surrounded by the one-dot chain line frame 39 are surrounded by broken line frames 40, which indicate that the travel risk value R is medium. Furthermore, the other area is surrounded by a broken line frame 38, which indicates that the travel risk value R is low.

Figure 23:
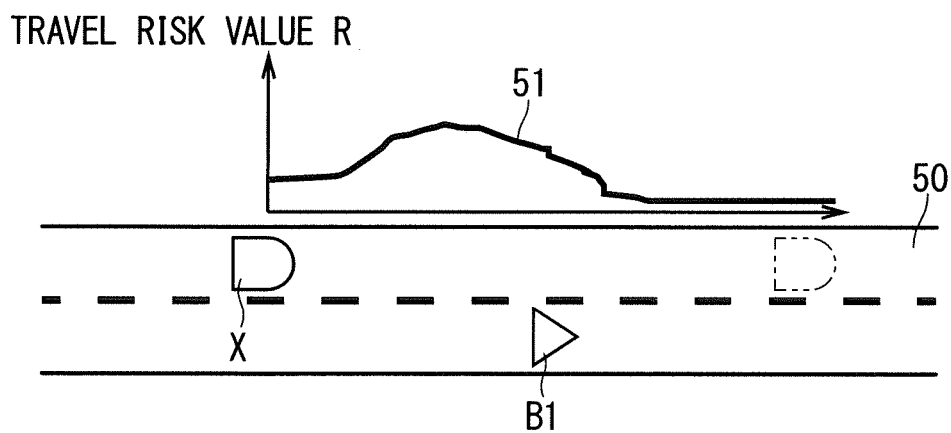
FIG. 23 is an image view showing a transition of the travel risk in the risk calculation section.

Though the magnitude of the travel risk value R is indicated for each section in the images shown in FIGS. 16 to 22, the output control unit 16 may produce an image showing the road image 50 together with a graph 51 indicating a transition of the travel risk value R, as shown in FIG. 23. With this image, the user can understand detailed transition of the travel risk value within the risk calculation section.

Figure 24:
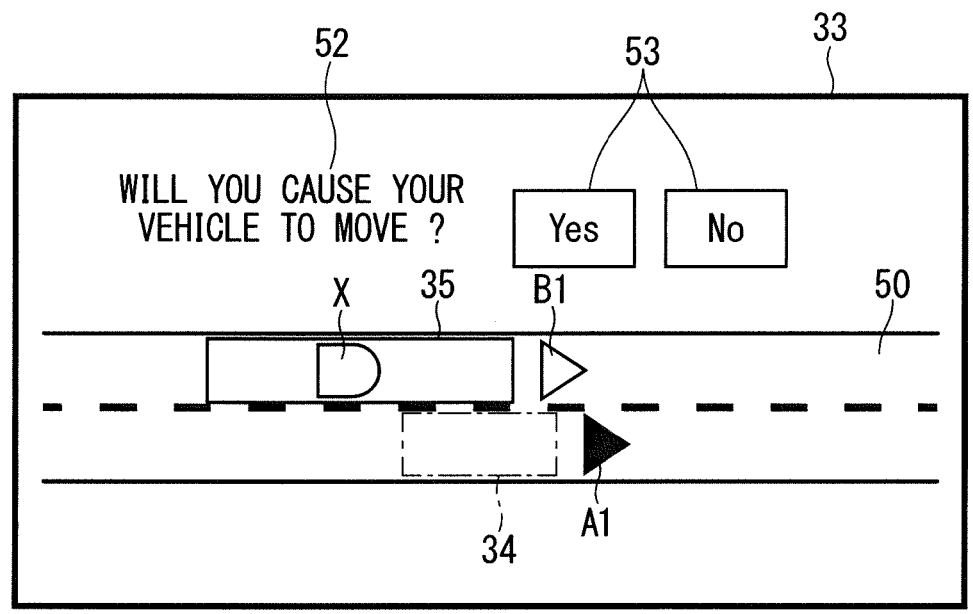
FIG. 24 is an image view used to check the permission to move to the risk reduction section with a user.

Further, in the flow of FIG. 13, after the output control unit 16 notifies the risk reduction section (Step S33), the travel plan correction unit 15 corrects the travel plan (Step S34). There may be a case, however, where the travel plan correction device 102 asks the user for permission to cause the self-vehicle X to move to the risk reduction section after notifying the risk reduction section and only when the user permits, the travel plan correction device 102 corrects the travel plan. FIG. 24 shows an image used to check the permission to move to the risk reduction section with the user. The image of FIG. 24 is different from that of FIG. 17 in that a text 52 of "Will you cause your vehicle to move?" and buttons 53 of "Yes" and "No" are displayed therein.

In order to calculate the travel risk value R in Step S13 of FIG. 2, the risk calculation unit 13 determines whether the surrounding vehicle around the self-vehicle X performs manual driving or autonomous driving, on the basis of the travel control information of the surrounding vehicle. At that time, the output control unit 16 may produce an image indicating whether the surrounding vehicle performs manual driving or autonomous driving and display the image on the display device 241.

Figure 25:
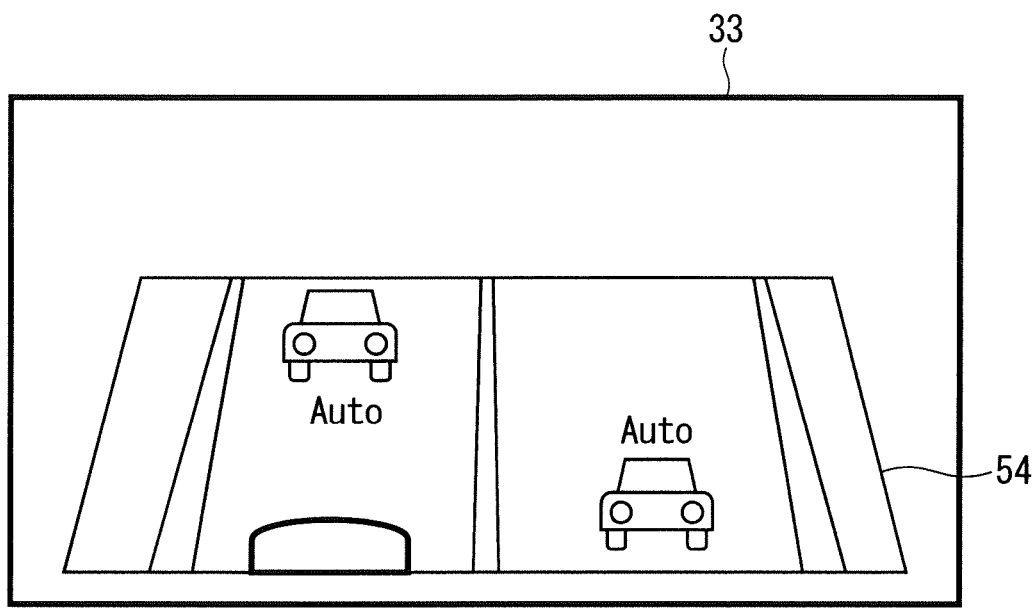
FIG. 25 is an image view showing whether a surrounding vehicle performs manual driving or autonomous driving.

For example, the output control unit 16 can display a determination result on whether the surrounding vehicle is an autonomous driving vehicle or a manual driving vehicle superimposedly on a forward picked-up image taken by a camera mounted on the self-vehicle X. FIG. 25 shows an exemplary case where when surrounding vehicles performing autonomous driving are running ahead of the self-vehicle X in the same lane and in the adjacent lane, respectively, the characters of "Auto" are superimposed on a forward picked-up image 54 for each of the surrounding vehicles in this image.

Figure 26:
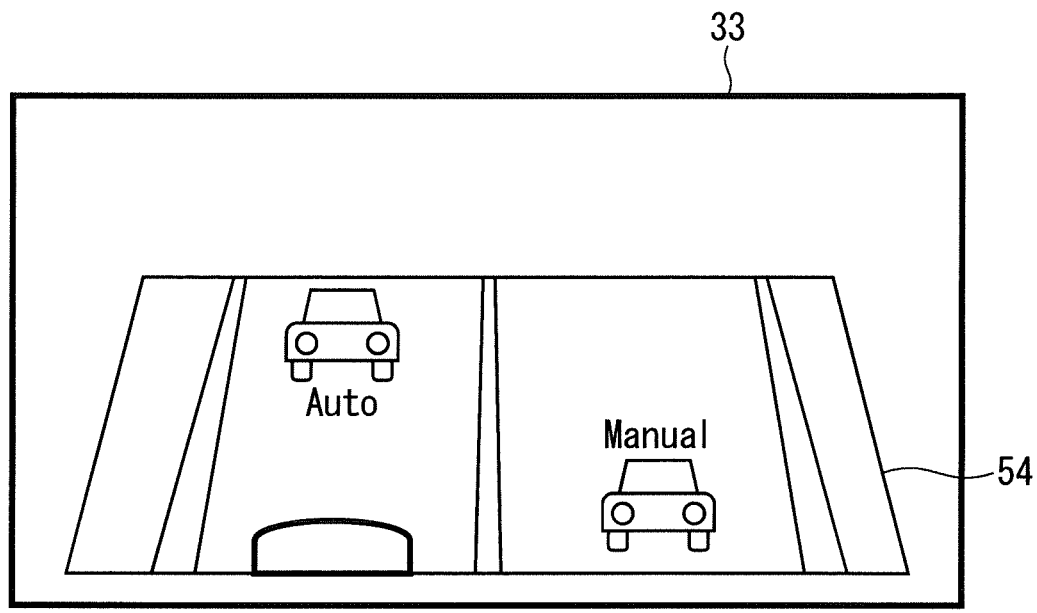
FIG. 26 is another image view showing whether a surrounding vehicle performs manual driving or autonomous driving.

FIG. 26 shows another exemplary case where when the surrounding vehicle running ahead of the self-vehicle X in the adjacent lane is an manual driving vehicle unlike in FIG. 25, the characters of "Manual" are superimposed on the forward picked-up image 54 for this vehicle in this image.

From these images, the user can grasp whether the surrounding vehicle is a manual driving vehicle or an autonomous driving vehicle.

Figure 27:
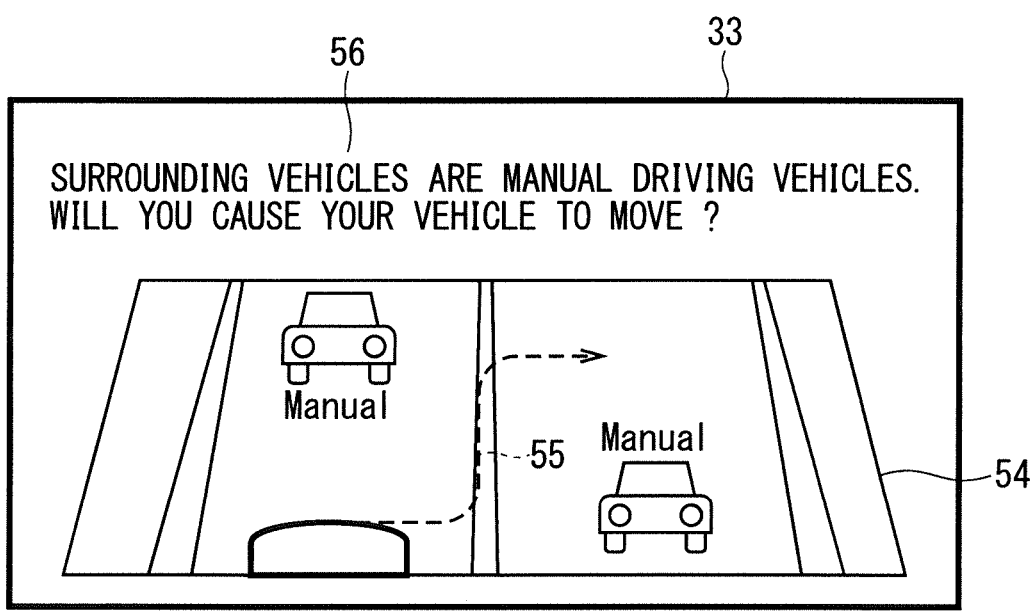
FIG. 27 is an image view used to check the permission to cause the self-vehicle to move to the risk reduction section with the user.

FIG. 27 shows an exemplary case where an image used to check the permission to cause the self-vehicle X to move to the risk reduction section with the user is achieved by using the forward picked-up image 54. In the image of FIG. 27, a moving path 55 of the self-vehicle X to the risk reduction section is superimposed on the forward picked-up image 54 and a text 56 of "Surrounding vehicles are manual driving vehicles. Will you cause your vehicle to move?" is displayed. Though FIG. 27 shows the exemplary case where the forward picked-up image 54 is displayed on the liquid crystal panel 33, when a head up display (HUD) is used as the display device 241, by projecting the travel control information of the surrounding vehicle, such as the characters of "Auto", or the moving path 55 on a windshield of the self-vehicle with the head up display so as to overlap a forward field of view of the user, i.e., a front landscape of the self-vehicle viewed from the user, the same effect can be produced.

B-3. Variations

In the above description, the risk calculation unit 13 sets the travel risk value R in accordance with whether the surrounding vehicle performs manual driving or autonomous driving. This is, however, only one exemplary case where the travel risk value R is set on the basis of the travel control information of the surrounding vehicle. Besides this information, the travel control information of the surrounding vehicle includes an automation level of the surrounding vehicle, control information of various actuators, information on the travel route of the surrounding vehicle, and the like. The risk calculation unit 13 may set the travel risk value R on the basis of any of these travel control information.

Figure 28:
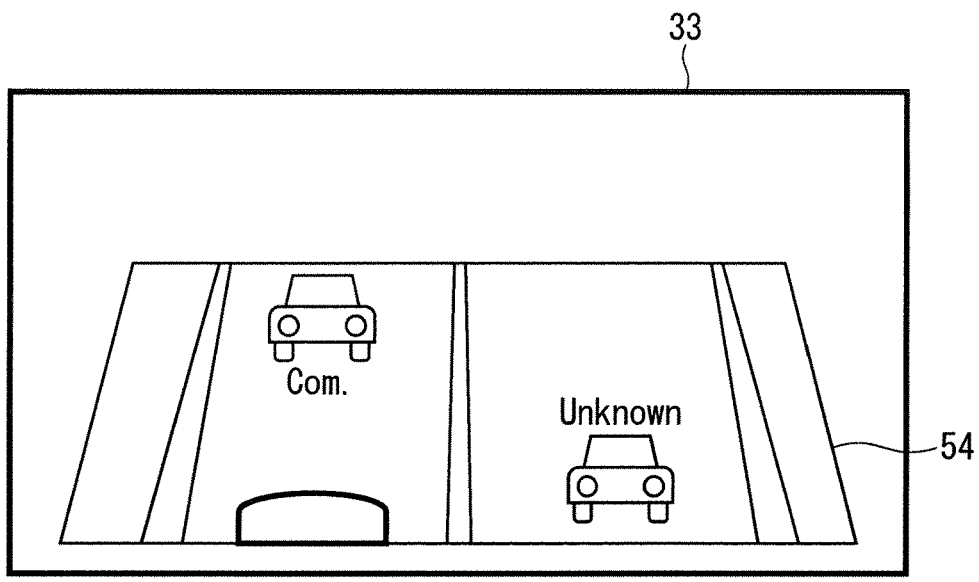
FIG. 28 is an image view showing whether the travel control information of the surrounding vehicle can be acquired or not.

Further, the risk calculation unit 13 may set a travel risk value R with respect to the surrounding vehicle whose travel control information cannot be acquired to be higher than a travel risk value R with respect to the surrounding vehicle whose travel control information can be acquired. Furthermore, as more travel control information of the surrounding vehicle can be acquired, the travel risk value R with respect to the surrounding vehicle may be set lower. At that time, the output control unit 16 may display an image indicating whether the travel control information of each surrounding vehicle can be acquired or not, as shown in FIG. 28. FIG. 28 shows an exemplary case where the characters of "Com." for the surrounding vehicle whose travel control information is acquired, among all the surrounding vehicles in the forward picked-up image 54, and the characters of "Unknown" for the surrounding vehicle whose travel control information cannot be acquired are superimposed on the forward picked-up image 54.

B-4. Effects

The travel plan correction device 102 in accordance with the second preferred embodiment of the present invention comprises the risk calculation section setting unit 12 for setting the risk calculation section which has a certain relative positional relation with the traveling spot S1 in a case where the self-vehicle X travels along the travel plan and includes the traveling spot S1, the risk calculation unit 13 for calculating the travel risk value R indicating a risk at the time when the self-vehicle X travels each of a plurality of target areas within the risk calculation section including the traveling spot S1, on the basis of the relative position between the target area and the surrounding vehicle and the travel control information of the surrounding vehicle, the risk reduction section extraction unit 14 for extracting a section with a travel risk value R lower than that at the traveling spot S1, out of the risk calculation section, as the risk reduction section, and the travel plan correction unit 15 for correcting the travel plan so as to cause the self-vehicle X to move to the risk reduction section.

Figure 29:
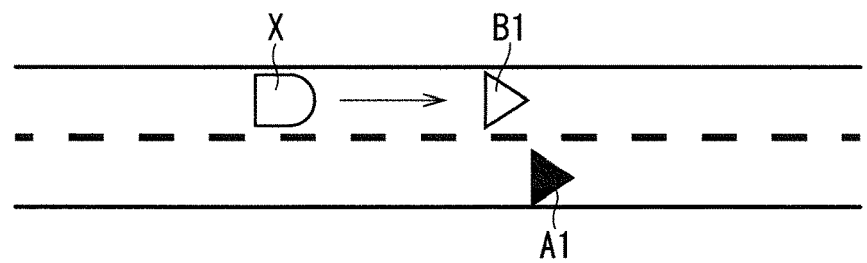
FIG. 29 is a view showing a positional relation between the self-vehicle and the surrounding vehicles.
Figure 30:
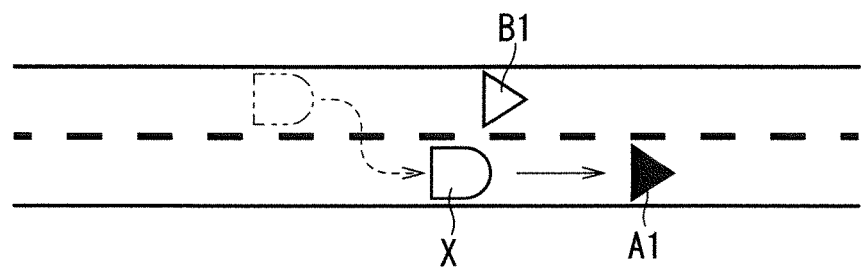
FIG. 30 is a view showing a positional relation between the self-vehicle and the surrounding vehicles.
Figure 31:
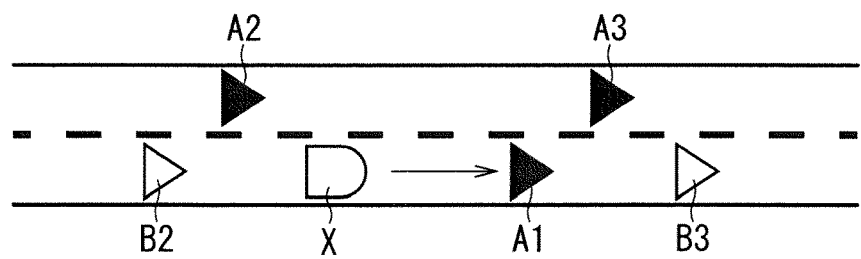
FIG. 31 is a view showing a positional relation between the self-vehicle and the surrounding vehicles.
Figure 32:
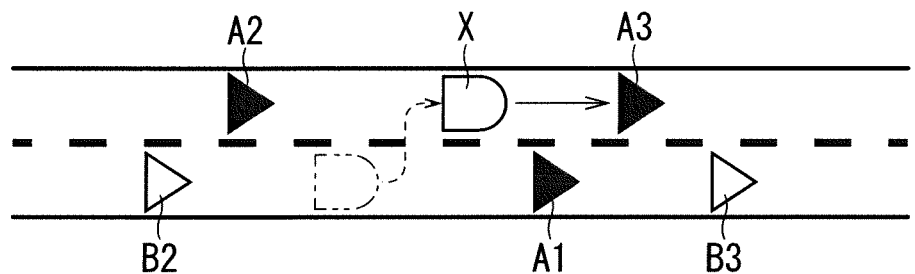
FIG. 32 is a view showing a positional relation between the self-vehicle and the surrounding vehicles.

Therefore, according to the travel plan correction device 102, it is possible to correct the travel plan so as to cause the self-vehicle X to move to a spot where the travel risk value R is lower within the risk calculation section. For example, FIG. 29 shows a state in which the self-vehicle X travels in the left lane, following the manual driving vehicle B1 running ahead, and the autonomous driving vehicle A1 travels ahead of the self-vehicle X in the right lane. In this case, by causing the self-vehicle X to change the lane to the right lane and travel while following the autonomous driving vehicle A1 as shown in FIG. 30, it is possible to further reduce the travel risk. FIG. 31 shows a state in which while the self-vehicle X travels in the right lane, following the autonomous driving vehicle A1, the manual driving vehicle B2 appears behind the self-vehicle X and in the left lane, the autonomous driving vehicle A3 travels ahead of the self-vehicle X and the autonomous driving vehicle A2 travels behind the self-vehicle X. In this case, when the self-vehicle X changes the lane to the left lane, the self-vehicle X can get away from the manual driving vehicle B2 and it is possible to further reduce the travel risk. Herein, when the travel risk is determined simply on the basis of what vehicle the self-vehicle X follows, it is not possible to determine whether to cause the self-vehicle X to change the lane to the left lane in the situation of FIG. 31. According to the travel plan correction device 102, however, since the travel risk is determined in terms of the relationship with not only the vehicle ahead of the self-vehicle X but also the surrounding vehicle running behind or beside the self-vehicle X, it is possible to correct the travel plan so as to cause the self-vehicle to change the lane to the left lane as shown in FIG. 32.

Figure 33:
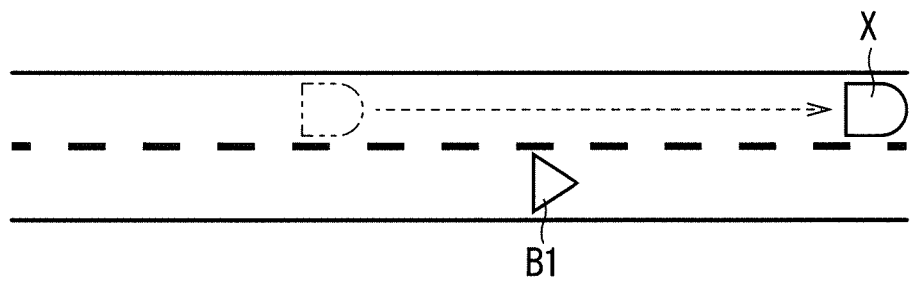
FIG. 33 is a view showing a positional relation between the self-vehicle and the surrounding vehicles.

Further, in the travel plan correction device 102, the travel plan correction unit 15 corrects the travel plan so as to cause the self-vehicle X to move to the risk reduction section even when there is a risk increase section with a travel risk value R higher than the travel risk value R(S1) at the traveling spot S1 between the traveling spot S1 and the risk reduction section. Therefore, according to the travel plan correction device 102, it is possible to correct the travel plan so as to cause the self-vehicle X to pass the area with higher travel risk where the self-vehicle X is a blind spot of the manual driving vehicle B1 and move to the risk reduction section beyond the area, as shown in FIG. 33.

C. The Third Preferred Embodiment

C-1. Constitution

Figure 34:
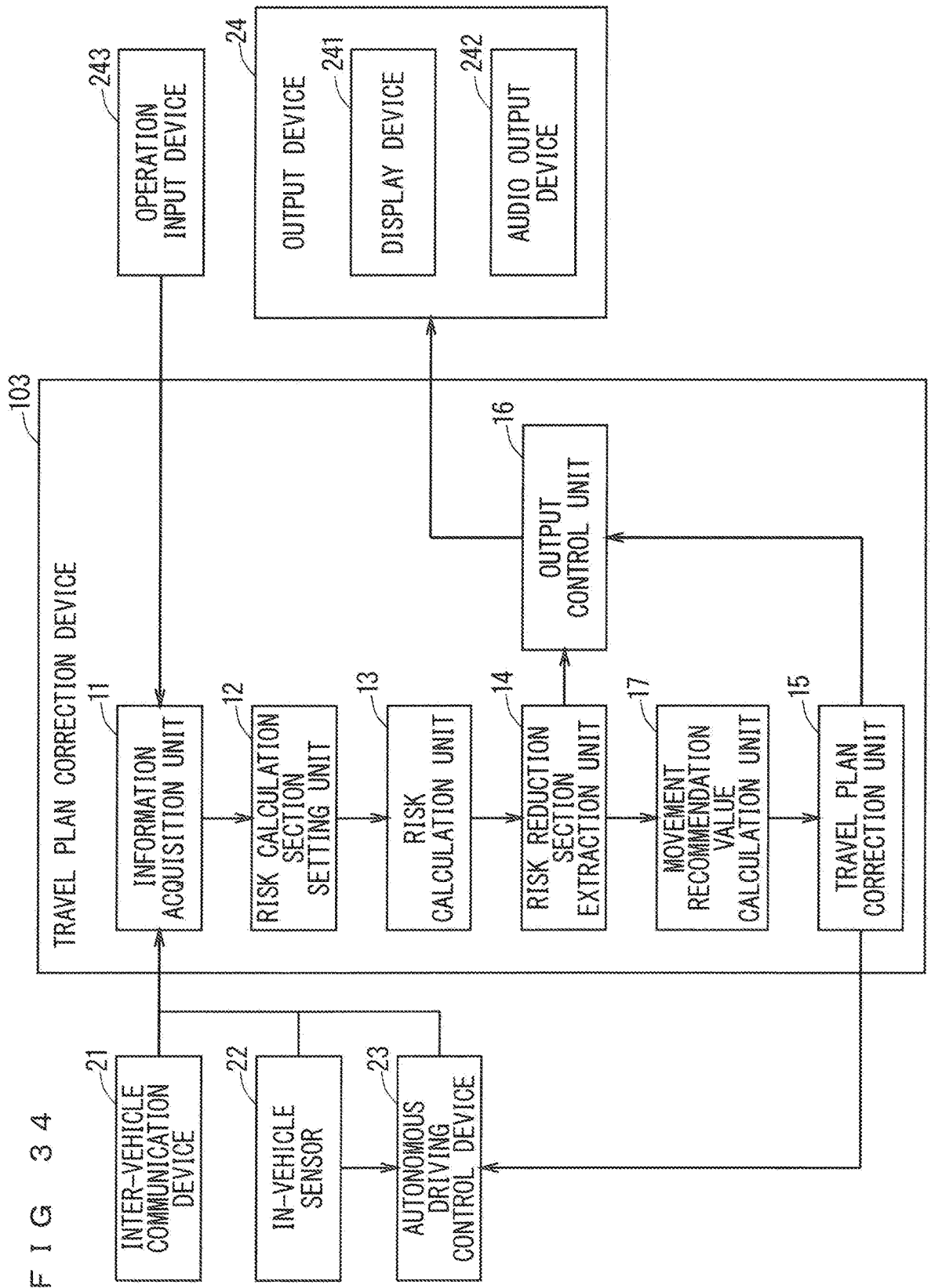
FIG. 34 is a block diagram showing a constitution of a travel plan correction device in accordance with a third preferred embodiment.

FIG. 34 is a block diagram showing a constitution of a travel plan correction device 103 in accordance with the third preferred embodiment of the present invention. The travel plan correction device 103 further comprises a movement recommendation value calculation unit 17 in addition to the constitution of the travel plan correction device 102 in accordance with the second preferred embodiment.

When there is a risk increase section between the risk reduction section extracted by the risk reduction section extraction unit 14 and the traveling spot S1 along the travel plan of the self-vehicle X, the movement recommendation value calculation unit 17 calculates a movement recommendation value to the risk reduction section. Though it is possible to reduce the travel risk value by causing the self-vehicle X to move from the traveling spot S1 to the risk reduction section, when there is a risk increase section between the traveling spot S1 and the risk reduction section, the travel risk value R of the self-vehicle X increases even if temporarily. Therefore, as an index to determine whether to cause the self-vehicle X to move to the risk reduction section even through the risk increase section, the movement recommendation value is calculated. The movement recommendation value is calculated while the increase in the travel risk of the self-vehicle X at the time when the self-vehicle X passes the risk increase section and the decrease in the travel risk of the self-vehicle X by moving to the risk reduction section are totally determined.

The travel plan correction unit 15 determines whether to cause the self-vehicle X to move to the risk reduction section on the basis of the movement recommendation value to the risk reduction section.

C-2. Operation

Figure 35:
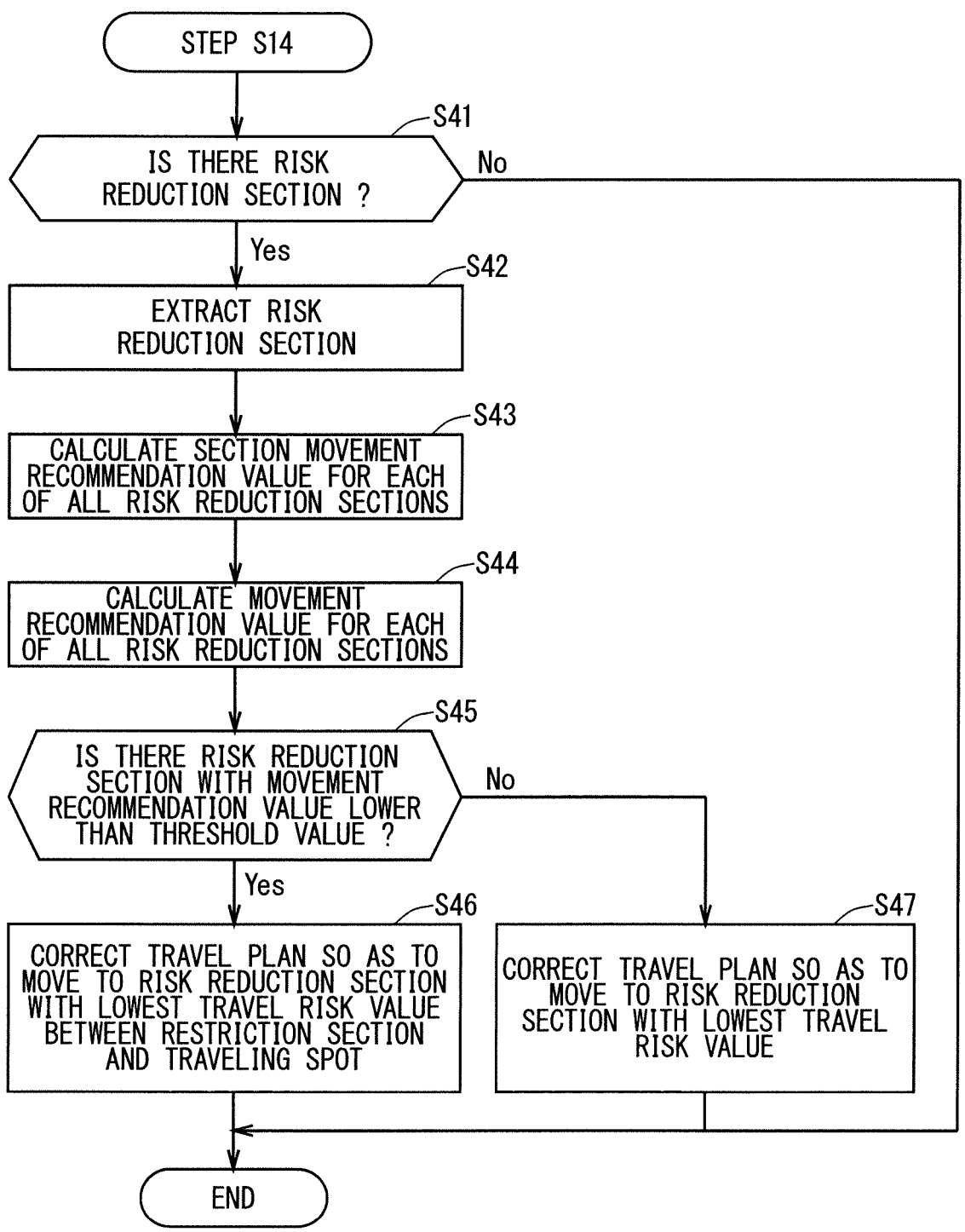
FIG. 35 is a flowchart showing details of Step S14 of FIG. 2 in the travel plan correction process performed by the travel plan correction device in accordance with the third preferred embodiment.

Though an overall flow of a travel plan correction process performed by the travel plan correction device 103 is the same as that shown in FIG. 2, since the operation in Step S14 of FIG. 2 is different from that in the first or second preferred embodiment, the flow is shown in FIG. 35 and description will be made with reference to the flow.

In FIG. 35, first, the risk reduction section extraction unit 14 determines whether or not there is a risk reduction section in the risk calculation section (Step S41). If there is no risk reduction section in the risk calculation section, the travel plan correction process is finished. On the other hand, when there is a risk reduction section in the risk calculation section, the risk reduction section extraction unit 14 extracts the risk reduction section (Step S42).

Figure 36:
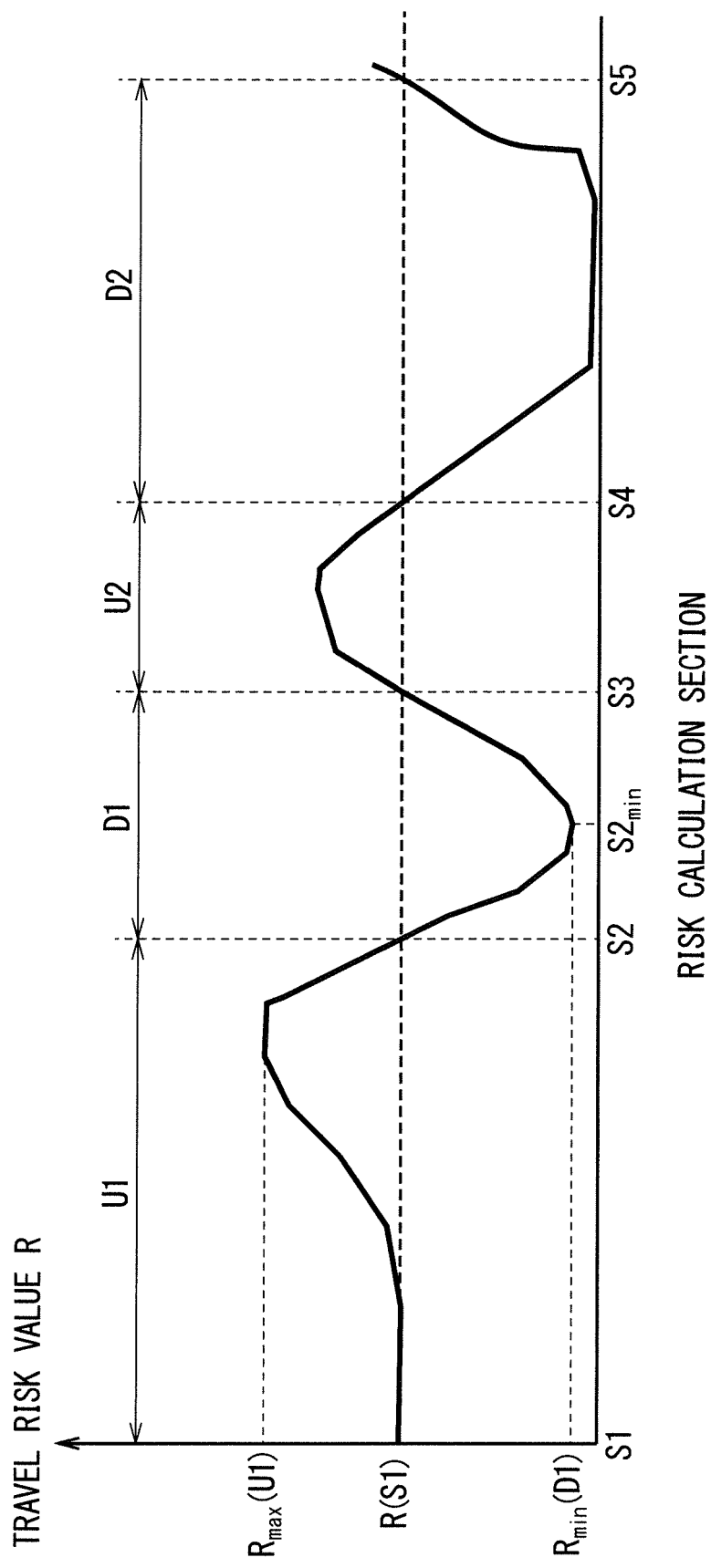
FIG. 36 is a graph showing a transition of the travel risk value in the risk calculation section.

Next, the movement recommendation value calculation unit 17 calculates a section movement recommendation value for each of all the risk reduction sections within the risk calculation section (Step S43). With reference to FIG. 36, the section movement recommendation value will be described. FIG. 36 shows a transition of the travel risk value R in the risk calculation section. Though FIG. 14 shows the transition of the travel risk value R from the traveling spot S1 to the target spot S3 at the time when the self-vehicle X travels along the travel plan, FIG. 36 shows a transition of a travel risk value R in the risk calculation section from the traveling spot S1 to a target spot S5 beyond the target spot S3. Since the traveling spot S1 and the target spots S2 and S3 are the same as those in FIG. 14, description thereof will be omitted. Target spots S4 and S5 indicate spots where the travel risk value R is equal to the travel risk value R(S1) at the traveling spot S1. Hereinafter, the traveling spot S1 and the target spots S2 to S5 will be sometimes referred to simply as "spots S1 to S5".

As shown in FIG. 36, a section from the spot S1 to the spot S2 and another section from spot S3 to the spot S4 are each the risk increase section where the travel risk value R increases from the travel risk value R(S1) at the spot S1. Then, a section from the spot S2 to the spot S3 and another section from spot S4 to the spot S5 are each the risk reduction section where the travel risk value R decreases from the travel risk value R(S1) at the spot S1. Herein, the section from the spot S1 to the spot S2, the section from the spot S2 to the spot S3, the section from the spot S3 to the spot S4, and the section from the spot S4 to the spot S5 will be referred to as a first risk increase section U1, a first risk reduction section D1, a second risk increase section U2, and a second risk reduction section D2, respectively.

The movement recommendation value calculation unit 17 calculates the section movement recommendation value for each of the first risk reduction section D1 and the second risk reduction section D2.

First, a section movement recommendation value P1 of the first risk reduction section D1 will be described. The section movement recommendation value P1 is an index to determine whether to cause the self-vehicle to move to the first risk reduction section D1 through the first risk increase section U1 which is an immediately preceding section of the first risk reduction section D1. The section movement recommendation value P1 is determined, for example, in the following manner.

For example, the movement recommendation value calculation unit 17 determines an integration value in the first risk increase section U1 of differences each between the travel risk value R for the first risk increase section U1 and the travel risk value R(S1) at the spot S1, $$P1a = -\int \{R(S)-R(S1)\}dS|S=S1\sim S2,$$

as a negative factor of the section movement recommendation value P1. Specifically, as the integration value P1$a$ becomes larger, the section movement recommendation value P1 tends to become smaller.

Further, the movement recommendation value calculation unit 17 determines a maximum value $R_{max}(U1)$ of the travel risk value R for the first risk increase section U1 being not smaller than a threshold value, as a negative factor of the section movement recommendation value P1.

Furthermore, the movement recommendation value calculation unit 17 determines an integration value in the first risk reduction section D1 of differences each between the travel risk value R(S1) at the spot S1 and the travel risk value R for the first risk reduction section D1, $$P1b = -\int \{R(S)-R(S1)\}dS|S=S2\sim S3,$$

as a positive factor of the section movement recommendation value P1. Specifically, as the integration value P1$b$ becomes larger, the section movement recommendation value P1 tends to become larger.

Alternatively, the movement recommendation value calculation unit 17 may determine an integration value in the first risk reduction section D1 of differences each between the travel risk value R(S1) at the spot S1 and a minimum value $R_{min}(D1)$ of the travel risk value R for the first risk reduction section D1, $$P1b' = \{R(S1)-R_{min}(D1)\} \times (S3-S2),$$

as a positive factor of the section movement recommendation value P1, instead of the integration value P1$b$. In this case, since P1$b'$>P1$b$, it is more recommended to move to the first risk reduction section.

Further, a difference between the travel risk value R(S1) at the spot S1 and a minimum value $R_{min}(D1)$ of the travel risk value R for the first risk reduction section D1 being not smaller than the threshold value is determined as a positive factor of the section movement recommendation value P1.

The movement recommendation value calculation unit 17 calculates the section movement recommendation value with respect to all the risk reduction sections by any of the above-described methods. As described above, the section movement recommendation value P1 for the first risk reduction section D1 is obtained by using the maximum value $R_{max}(U1)$ of the travel risk value in the first risk increase section U1, the integration value of the differences each between the travel risk value R for the first risk increase section U1 and the travel risk value R(S1) at the spot S1, the minimum value $R_{min}(D1)$ of the travel risk value in the first risk reduction section D1, the integration value of the differences each between the travel risk value R for the first risk reduction section D1 and the travel risk value R(S1) at the spot S1, or the like.

In the calculation of the section movement recommendation value P1, the movement recommendation value calculation unit 17 does not need to use all the above-described factors but has only to use at least one factor. For example, the movement recommendation value calculation unit 17 can obtain the section movement recommendation value P1 by the following equation on the basis of the integration value P1$a$ in the first risk increase section U1 of the differences each between the travel risk value R for the first risk increase section U1 and the travel risk value R(S1) at the spot S1. P1$a_{TH}$ is, however, a predetermined threshold value.

[Numeral 1]

$$P1 = \begin{cases} 1 (P1a > P1a_{TH}) \\ -1 (P1a \leq P1a_{TH}) \end{cases} \quad (1)$$

Further, the movement recommendation value calculation unit 17 can obtain the section movement recommendation value P1 by the following equation on the basis of the maximum value $R_{max}(U1)$ of the travel risk value R in the first risk increase section U1. $R_{maxTH}$ is, however, a predetermined threshold value.

[Numeral 2]

$$P1 = \begin{cases} 1 (R_{max}(U1) < R_{maxTH}) \\ -5 (R_{max}(U1) \geq R_{maxTH}) \end{cases} \quad (2)$$

Furthermore, the movement recommendation value calculation unit 17 can obtain the section movement recommendation value P1 by the following equation on the basis of the integration value P1$b$ in the first risk reduction section D1 of the differences each between the travel risk value R(S1) at the spot S1 and the travel risk value R for the first risk reduction section D1. P1$b_{TH}$ is, however, a predetermined threshold value.

[Numeral 3]

$$P1 = \begin{cases} 1 (P1b > P1b_{TH}) \\ 0 (P1b \leq P1b_{TH}) \end{cases} \quad (3)$$

Further, the movement recommendation value calculation unit 17 can obtain the section movement recommendation value P1 on the basis of the minimum value $R_{min}$ of the travel risk value R in the first risk reduction section D1. For example, the section movement recommendation value P1 is obtained by the following equation on the basis of the difference between the travel risk value R(S1) at the spot S1 and the minimum value $R_{min}(D1)$ of the travel risk value R in the first risk reduction section D1. $R_{minTH}$ is, however, a predetermined threshold value.

[Numeral 4]

$$P1 = \begin{cases} 1(\{R(S1) - R_{min}(D1)\} > R_{minTH}) \\ 0(\{R(S1) - R_{min}(D1)\} \leq R_{minTH}) \end{cases} \quad (4)$$

Though the cases each where the section movement recommendation value P1 is determined by one factor have been described above, the section movement recommendation value P1 may be determined by a plurality of factors. For example, the movement recommendation value calculation unit 17 may determine a total value of the respective values calculated by using Equation (1) to Equation (4), as the section movement recommendation value P1. At that time, the movement recommendation value calculation unit 17 may add an appropriate weighting factor to each term or perform a normalization process.

Further, the movement recommendation value calculation unit 17 may use the following equation instead of Equation (4). $R_{minTH}$ and $R_{minTH2}$ are, however, predetermined threshold values.

[Numeral 5]

$$P1 = \begin{cases} 2(\{R(S1) - R_{min}(D1)\} > R_{minTH2}) \\ 1(R_{minTH2} \geq \{R(S1) - R_{min}(D1)\} > R_{minTH1}) \\ 0(\{R(S1) - R_{min}(D1)\} \leq R_{minTh1}) \end{cases} \quad (5)$$

The movement recommendation value calculation unit 17 may obtain the section movement recommendation value P1 by using a multivalued function having a plurality of threshold values like in Equation (5) or by using such a function as to obtain a normalized analog value.

Furthermore, the movement recommendation value calculation unit 17 may obtain the section movement recommendation value P1 by using the following equation, on the basis of the sum of the integration value P1a in the first risk increase section U1 of the differences each between the travel risk value R for the first risk increase section U1 and the travel risk value R(S1) at the spot S1 and the integration value P1b in the first risk reduction section D1 of the differences each between the travel risk value R(S1) at the spot S1 and the travel risk value R for the first risk reduction section D1. At that time, the movement recommendation value calculation unit 17 may add an appropriate weighting factor to each term or perform a normalization process.

[Numeral 6]

$$P1 = P1a + P1b \quad (6)$$

Like the above calculations of the section movement recommendation value P1, a section movement recommendation value P2 for the second risk reduction section D2 is obtained by using a maximum value of the travel risk value in the second risk increase section U2, an integration value of differences each between the travel risk value for the second risk increase section U2 and the travel risk value R(S1) at the spot S1, a minimum value of the travel risk value in the second risk reduction section D2, an integration value of differences each between the travel risk value R for the second risk reduction section D2 and the travel risk value R(S1) at the spot S1, or the like.

The above-described calculation methods of the section movement recommendation value are only exemplary methods, and combination of any ones of all parameters related to the travel risk value R can be used for the calculation. In the above-described calculation methods of the section movement recommendation value, though the integration with respect to the distance is performed, an integration with respect to the travel time may be performed, or combination of these integrations may be performed.

Next, the movement recommendation value calculation unit 17 calculates the movement recommendation value with respect to all the risk reduction sections (Step S44). Specifically, the movement recommendation value calculation unit 17 determines an accumulated value of the section movement recommendation values each of which is obtained with respect to the section from the traveling spot, S1 to each risk reduction section, as the movement recommendation value for the risk reduction section. In the exemplary case shown in FIG. 36, the section movement recommendation value for the first risk reduction section D1 is determined as the movement recommendation value for the first risk reduction section D1, and a total value of the section movement recommendation value for the first risk reduction section D1 and the section movement recommendation value for the second risk reduction section D2 is determined as the movement recommendation value for the second risk reduction section D2.

Thus, the movement recommendation value calculation unit 17 can calculate the movement recommendation value which serves as an index to determine whether to move from the traveling spot S1 to the risk reduction section through the increase and decrease of the travel risk value R.

It has been described above that the integration value of the differences each between the travel risk value R(S1) at the traveling spot S1 and the travel risk value R for the risk reduction section is determined as a positive factor of the section movement recommendation value.

The movement recommendation value to the first risk reduction section D1 is equal to the section movement recommendation value P1 for the first risk reduction section D1. The movement recommendation value to the second risk reduction section D2 is obtained by accumulating the section movement recommendation value P1 for the first risk reduction section D1 and the section movement recommendation value P2 for the second risk reduction section D2. Similarly, the movement recommendation value to a N-th risk reduction section DN is obtained by accumulating respective section movement recommendation values P1, P2, . . . PN for all the risk reduction sections from the first risk reduction section D1 to the N-th risk reduction section DN.

It has been described above that the integration value P1b in the first risk reduction section D1 of the differences each between the travel risk value R(S1) and the travel risk value R for the risk reduction section D1 is determined as a positive factor of the section movement recommendation value P1 for the first risk reduction section. In this case, it is assumed that the self-vehicle moves from an end to the other end of the first risk reduction section D1. As to the section movement recommendation value for a risk reduction section which is a calculation target of the movement recommendation value, however, a positive factor may be determined by assuming that the self-vehicle does not move from an end to the other and of this risk reduction section and after the self-vehicle reaches a spot where the travel risk value R is minimum, the self-vehicle travels while staying at the spot.

Specifically, assuming that the positive factor of the section movement recommendation value P1 on the basis of the assumption that the self-vehicle travels while staying at the spot where the travel risk value R is minimum is $P1b_{long}$, $P1b_{long}$ is represented by the following equation.

[Numeral 7]

$$P1b_{long} = \int_{S2}^{S2min} \{R(S)-R(S1)\}dS - \{R_{min}(D1)-R(S1)\} \times S_{long} \quad (7)$$

Specifically, the positive factor $P1b_{long}$ is determined as the sum of an integration value in a section from the spot S2 to the spot $S2_{min}$ of differences each between the travel risk value R(S1) and the travel risk value R and an integration value in a distance $S_{long}$ that the self-vehicle plans to travel after the self-vehicle reaches the spot $S2_{min}$, of differences each between the minimum value $R_{min}(D1)$ of the travel risk value R in the first risk reduction section D1 and the travel risk value R(S1). Herein, it is assumed that after the self-vehicle reaches the spot $S2_{min}$, the self-vehicle continues to travel the spot $S2_{nin}$.

When the section movement recommendation value for the risk reduction section is represented as a linear sum of the positive factors and the negative factors, the positive factor of the movement recommendation value for each risk reduction section is expressed as follows. Specifically, the positive factor of the movement recommendation value for the first risk reduction section D1 is $P1b_{long}$. Further, the positive factor of the movement recommendation value for the second risk reduction section D2 is $P1+P2b_{long}$. Furthermore, the positive factor of the movement recommendation value for the N-th risk reduction section DN is $P1+P2+ \ldots +P(N-1)+PNb_{long}$.

Next, the travel plan correction unit 15 determines whether or not there is a risk reduction section with the movement recommendation value lower than a threshold value (Step S45). When there is a risk reduction section with the movement recommendation value lower than the threshold value, the travel plan correction unit 15 determines this risk reduction section as a restriction section where the movement of the self-vehicle X beyond this section is restricted, and corrects the travel plan so as to cause the self-vehicle X to move to a risk reduction section with the lowest travel risk value R among risk reduction sections which are present between the restriction section and the traveling spot S1 of the self-vehicle X (Step S46). On the other hand, if there is no risk reduction section with the movement recommendation value lower than the threshold value, the travel plan correction unit 15 corrects the travel plan so as to cause the self-vehicle X to move to a risk reduction section with the lowest travel risk value R among all the risk reduction sections (Step S47). When there is a section with the movement recommendation value lower than the threshold value, the movement of the self-vehicle X beyond the section is thereby restricted. Further, the risk reduction section with the lowest travel risk value refers to, for example, a risk reduction section with the smallest minimum value of the travel risk value R in the risk reduction section.

C-3. Variations

In the above description, for simplification of the description, it has been assumed that the surrounding vehicle travels at a constant speed and the positional relation between the surrounding vehicle and the self-vehicle is not changed as time goes by. The present invention, however, can be also applied to a case where the surrounding vehicle does not travel at a constant speed.

Figure 37:
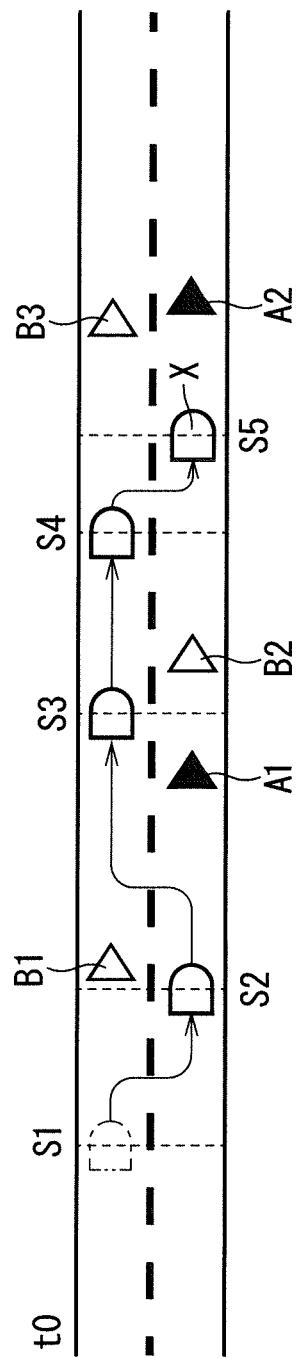
FIG. 37 is a view showing a positional relation between the self-vehicle and the surrounding vehicles at the time t0.

FIG. 37 shows a positional relation between a self-vehicle and the surrounding vehicles X at the time t0. The target spot S1 indicates the traveling spot S1 of the self-vehicle X at the time t0, and the target spots S2, S3, S4, and S5 are spots where the travel risk value R is equal to the travel risk value R at the traveling spot S1.

Figure 38:
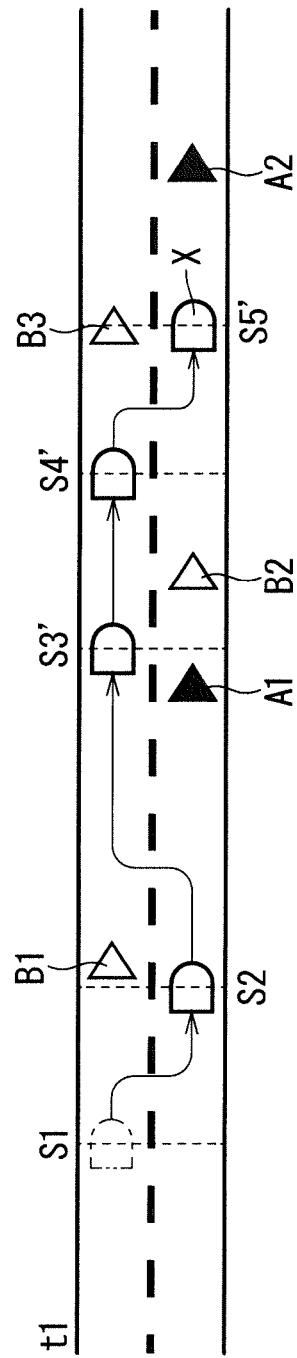
FIG. 38 is a view showing a positional relation between the self-vehicle and the surrounding vehicles at the time t1 in a case where a travel speed of the surrounding vehicle running in the right lane is higher than that of the surrounding vehicle running in the left lane.

FIG. 38 shows a positional relation between the self-vehicle and the surrounding vehicles at the time t1 (t1>t0) in a case where a travel speed of the surrounding vehicle running in the right lane is higher than that of the surrounding vehicle running in the left lane. The inter-vehicle distances between the self-vehicle X running in the left lane and the surrounding vehicles A1, A2, and B2 running in the right lane are larger than those in FIG. 37.

Figure 40:
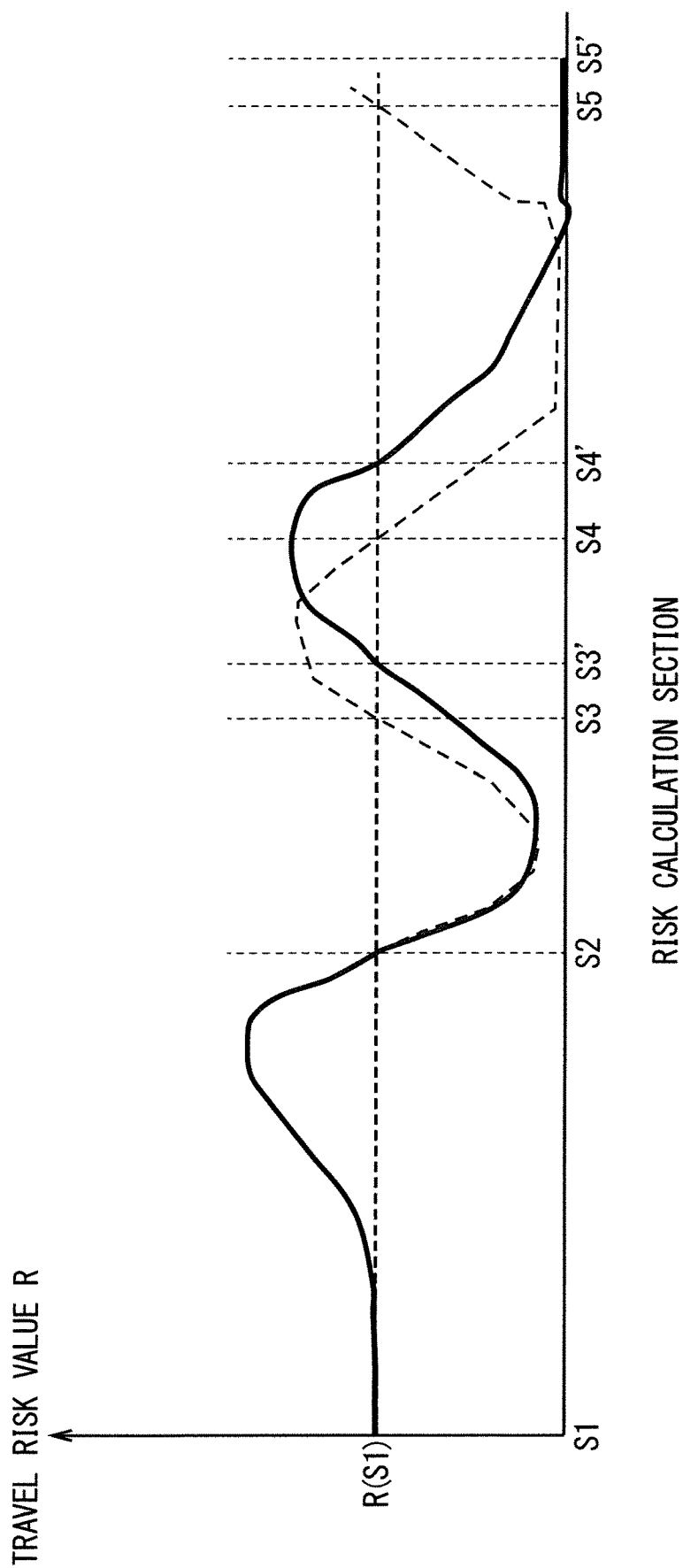
FIG. 40 is a graph showing a transition of the travel risk value in the risk calculation section.

FIG. 40 shows a transition of the travel risk value R in the risk calculation section. In FIG. 40, the dotted line indicates the travel risk value at the time t0 and the solid line indicates the travel risk value R at the time t1. The relative positions of the target spots where the travel risk value R is equal to that at the traveling spot S1 with respect to the traveling spot S1 vary with changes in the inter-vehicle distances between the self-vehicle X and the surrounding vehicles A1, A2, and B2. Specifically, the target spots S3, S4, and S5 at the time t0 are changed to target spots S3', S4', and S5', respectively, at the time t1.

Figure 39:
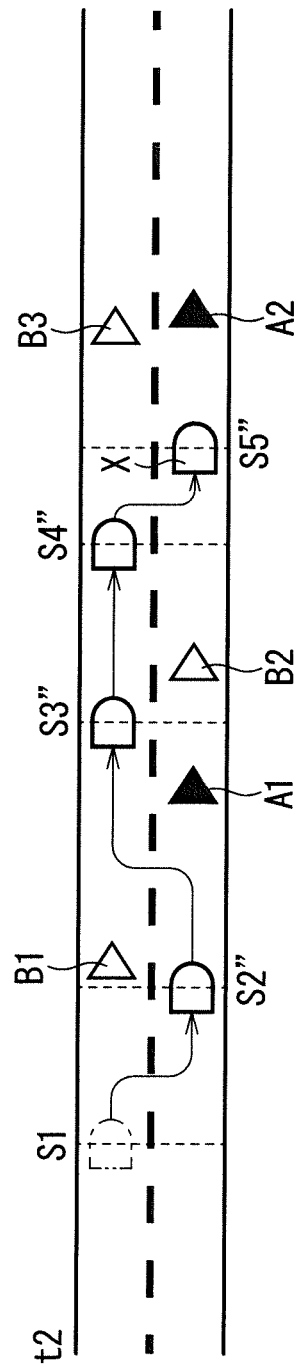
FIG. 39 is a view showing a positional relation between the self-vehicle and the surrounding vehicles at the time t2 in a case where the self-vehicle runs faster than the surrounding vehicles.

FIG. 39 shows a positional relation between the self-vehicle X and the surrounding vehicles A1, A2, B1, B2, and B3 at the time t2 (t2>t0) in a case where the self-vehicle X runs faster than the surrounding vehicles A1, A2, B1, B2, and B3. It is assumed that the travel speeds of the surrounding vehicles A1, A2, B1, B2, and B3 are constant and equal to one another. The inter-vehicle distances between the self-vehicle X and the surrounding vehicles A1, A2, B1, B2, and B3 running ahead of the self-vehicle X are smaller than those in FIG. 37.

Figure 41:
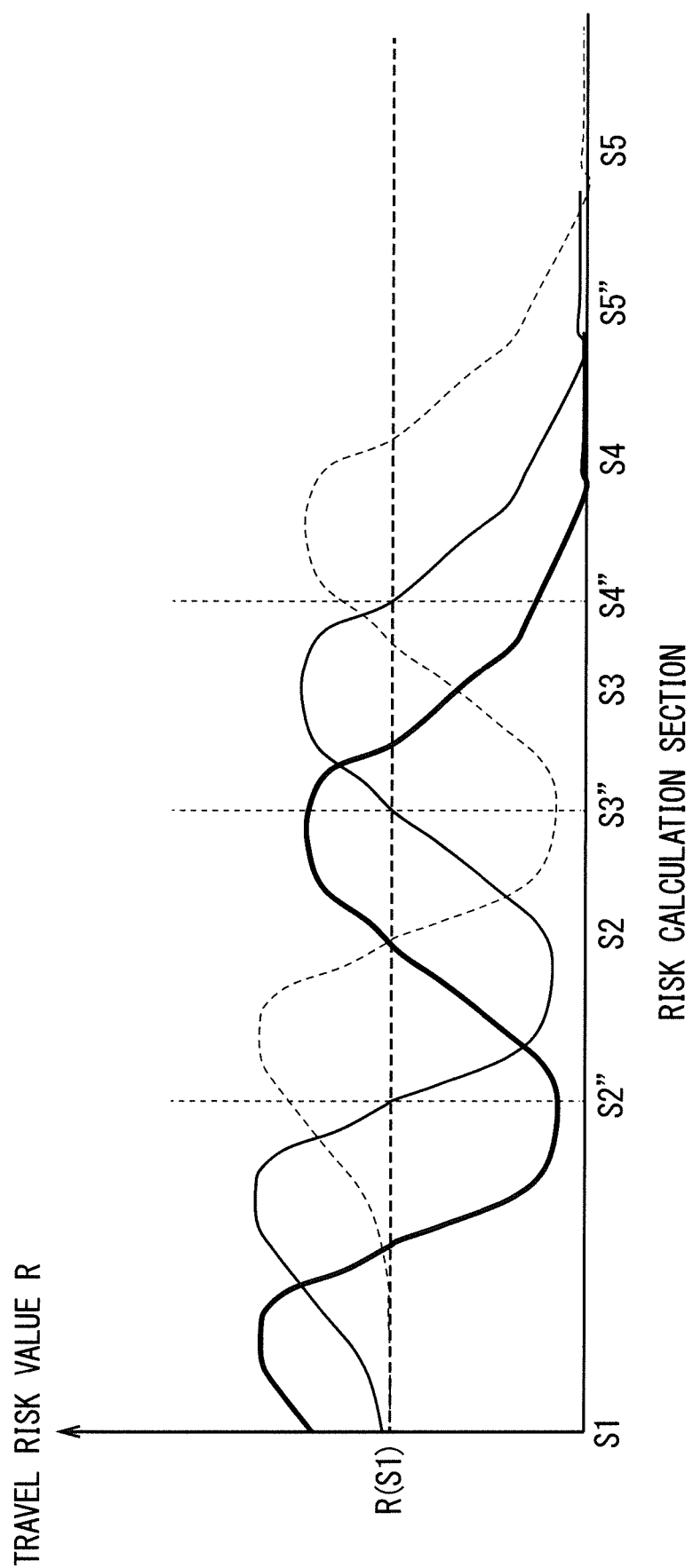
FIG. 41 is a graph showing a transition of the travel risk value in the risk calculation section.

FIG. 41 shows a transition of the travel risk value R in the risk calculation section. In FIG. 41, the dotted line indicates the travel risk value R at the time t0 shown in FIG. 37 and the thin solid line indicates the travel risk value R at the time t2 shown in FIG. 39. Further, the thick solid line indicates the travel risk value at the time t3 (t3>t2). As the time proceeds from the time t0 to the time t2, the graph of the travel risk value shifts from the dotted line graph to the thin solid line graph. Further, as the time proceeds from the time t2 to the time t3, the graph of the travel risk value R shifts from the thin solid line graph to the thick solid line graph. Thus, the graph of the travel risk value R shifts leftward as time goes by.

Thus, when the travel speed of the self-vehicle X is different from those of the surrounding vehicles A1, A2, B1, B2, and B3, the travel risk value in the risk calculation section varies as time goes by. For this reason, in consideration of such time variation of the travel risk value R, the section movement recommendation value is calculated. For the calculation, various optimization calculation algorithms, such as a DP (dynamic programming) matching method and the like, can be used.

C-4. Effects

The travel plan correction device 103 further comprises the movement recommendation value calculation unit 17 for calculating the movement recommendation value which is an index to determine whether to move from the traveling spot S1 to the risk reduction section in addition to the constitution of the travel plan correction device 101. When there is a risk increase section between the traveling spot S1 and the risk reduction section, the travel plan correction unit 15 determines whether to correct the travel plan so as to cause the self-vehicle X to move to the risk reduction section on the basis of the movement recommendation value. Therefore, according to the travel plan correction device 103, when there is a risk increase section between the current spot of the self-vehicle and the risk reduction section, it is possible to appropriately determine whether to cause the self-vehicle to move to the risk reduction section through the risk increase section.

Further, the movement recommendation value calculation unit 17 calculates the section movement recommendation value which is an index to determine whether to move to the risk reduction section through the risk increase section which is an immediately preceding section, for each of all the risk reduction sections within the risk calculation section, and determines the accumulated value of the section movement recommendation values from the traveling spot S1 to the risk reduction section as the movement recommendation value of the risk reduction section. Therefore, according to the travel plan correction device 103, even when there are a plurality of risk reduction sections and a plurality of risk increase sections within the risk calculation section, it is possible to appropriately determine whether to move to each risk reduction section.

D. The Fourth Preferred Embodiment

D-1. Constitution

Figure 42:
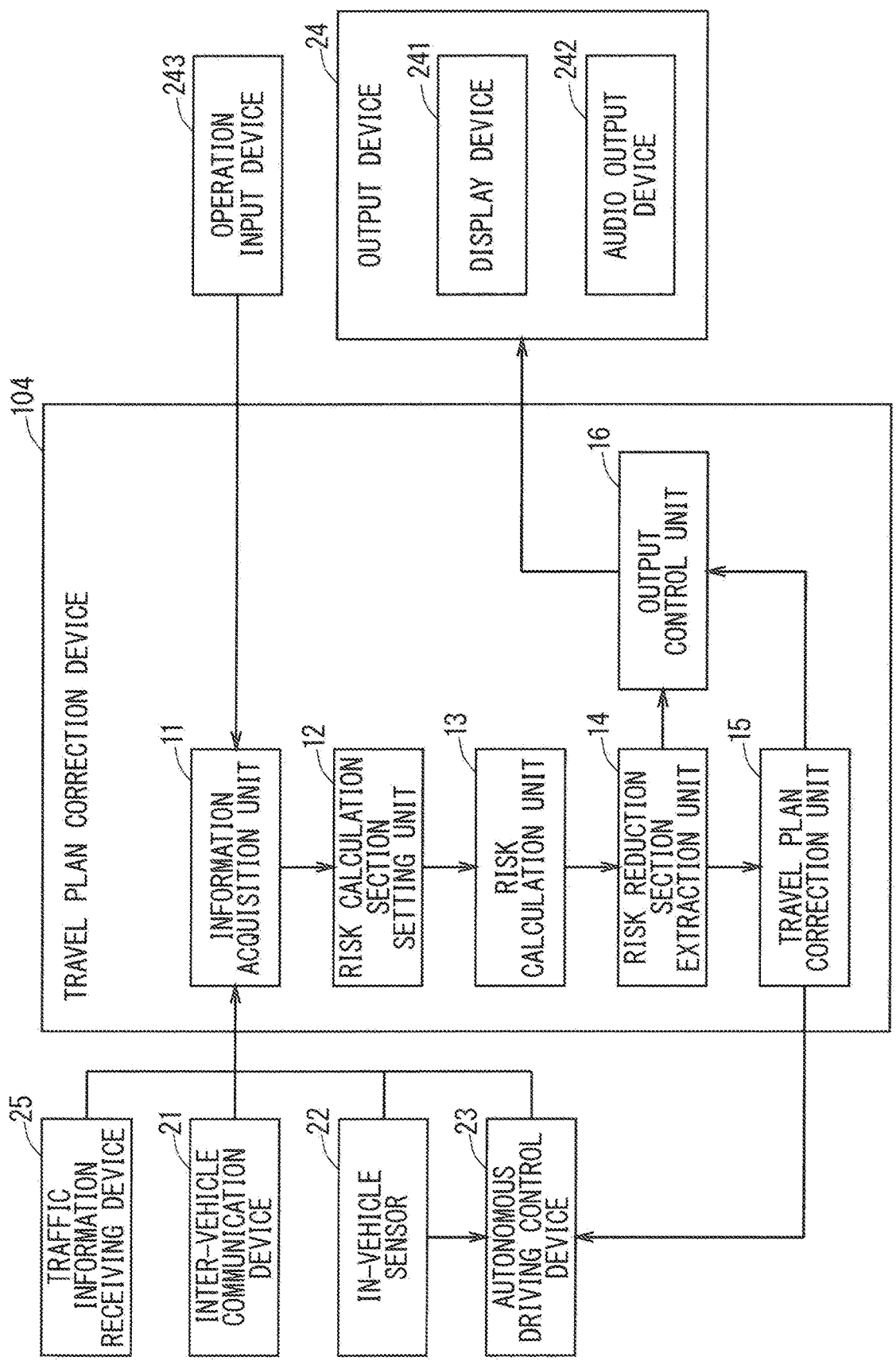
FIG. 42 is a block diagram showing a constitution of a travel plan correction device in accordance with a fourth preferred embodiment.

FIG. 42 is a block diagram showing a constitution of a travel plan correction device 104 in accordance with the fourth preferred embodiment of the present invention. The travel plan correction device 104 is characterized in that the information acquisition unit 11 receives traffic information from a traffic information receiving device 25, and has the same constitution as that of the travel plan correction device 103 in accordance with the third preferred embodiment other than this characteristic point.

The traffic information receiving device 25 is, for example, mounted on the self-vehicle X, and acquires the traffic information and outputs the information to the information acquisition unit 11. The traffic information is, for example, VICS (Vehicle Information and Communication System (registered trademark)) information or the like, and includes position information and the travel control information of the surrounding vehicle. Therefore, the information acquisition unit 11 can acquire relative position information of the distant surrounding vehicle which cannot be detected by the in-vehicle sensor 22 with respect to the self-vehicle X from the traffic information.

The risk calculation section setting unit 12 sets the risk calculation section. In the second preferred embodiment, the risk calculation section is set within a range where the surrounding vehicle which can be detected by the in-vehicle sensor 22 is present. On the other hand, the risk calculation section setting unit 12 of the fourth preferred embodiment can set a range where the surrounding vehicle whose relative position with respect to the self-vehicle X is acquired by the information acquisition unit 11 using the traffic information is present, i.e., a range wider than that of the second preferred embodiment, as the risk calculation section.

D-2. Operation

A travel plan correction process performed by the travel plan correction device 104 is executed along the flowcharts in FIGS. 2 and 13 and is the same as that in the second preferred embodiment. In the fourth preferred embodiment, however, the risk calculation section which is wider than that in the second preferred embodiment is set.

Figure 43:
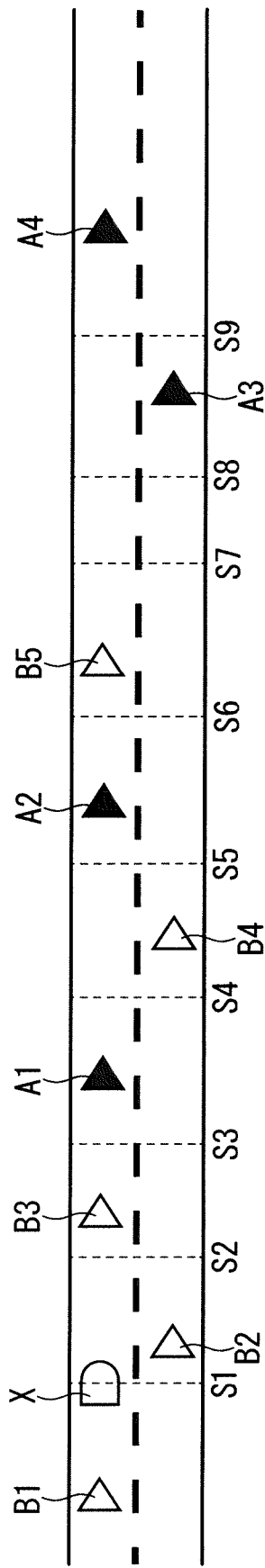
FIG. 43 is a view showing a positional relation between the self-vehicle and the surrounding vehicles in the risk calculation section of the fourth preferred embodiment.

FIG. 43 shows a positional relation between the traveling spot S1 of the self-vehicle X and the surrounding vehicles A1 to A4 and B1 to B5 in the risk calculation section of the fourth preferred embodiment. FIG. 43 shows not only the traveling spot S1 of the self-vehicle X but also the target spots S2 to S9. Further, the surrounding vehicles A1 to A4 are autonomous driving vehicles and the surrounding vehicles B1 to B5 are manual driving vehicles.

Figure 44:
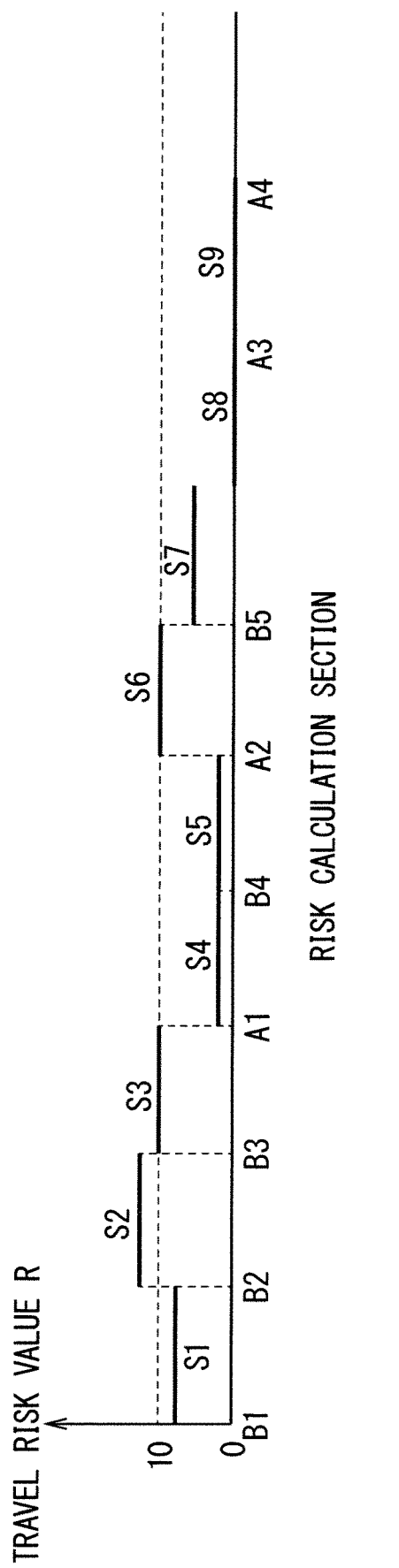
FIG. 44 is a view showing a travel risk value at each target spot shown in FIG. 43 during traveling in the left lane.
Figure 45:
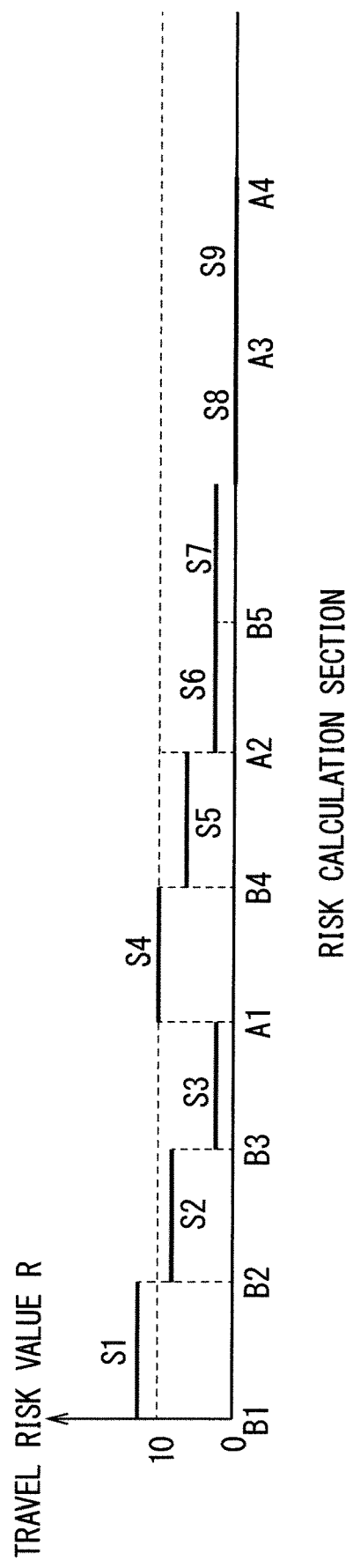
FIG. 45 is a view showing a travel risk value at each target spot shown in FIG. 43 during traveling in the right lane.

FIG. 44 shows a travel risk value during traveling in the left lane at each of the target spots S1 to S9 shown in FIG. 43. Further, FIG. 45 shows a travel risk value R during traveling in the right lane at each of the target spots S1 to S9 shown in FIG. 43. Furthermore, though the travel risk value R at the target spot S1 is shown herein in each of the right lane and the left lane, the target spot S1 is actually predetermined in either of the right lane and the left lane by the current travel plan of the self-vehicle X.

FIG. 46 shows respective travel risk values R at the target spots S1 to S9 shown in FIG. 43 for each of the right lane and the left lane. For example, the travel risk value R at the target spot S1 in the left lane is 2 with respect to the vehicle B3 running ahead in the same lane, 4 with respect to the vehicle B1 running behind in the same lane, and 2 with respect to the vehicle B2 running ahead in the adjacent lane, and is totally 8. Similarly, the travel risk value R at the target spot S1 in the right lane is 10 with respect to the vehicle B2 running ahead in the same lane and 2 with respect to the vehicle B3 running ahead in the adjacent lane, and is totally 12. Therefore, at the target spot S1, the travel risk value R in the left lane is lower than that in the right lane.

The risk reduction section extraction unit 14 selects the travel risk value R in the lane where the travel risk value R is lowest at each of the target spots S1 to S9. In FIG. 46, at each of the target spots S1 to S9, the travel risk value R in the lane where the travel risk value R is lowest is circled.

Figure 47:
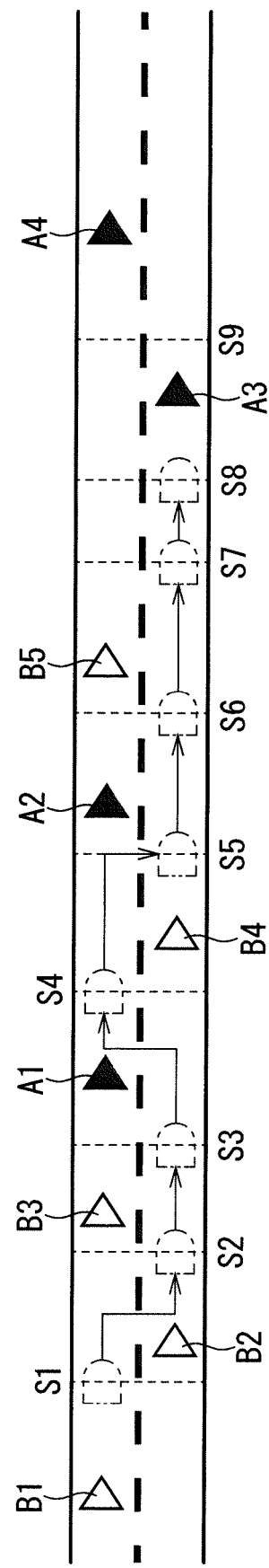
FIG. 47 is a view showing a moving path of the self-vehicle from a traveling spot S1 to a target spot S8.

The travel plan correction unit 15 corrects the travel plan so as to cause the self-vehicle X to move to the target spot S8 where the travel risk value R is lowest among the traveling spot S1 and the target spots S2 to S9. Specifically, the travel plan is corrected so as to cause the self-vehicle X to move from the traveling spot S1 to the target spot S8 while changing the lane in such a manner as to trace the travel risk value R circled in FIG. 46. At that time, the moving path from the traveling spot S1 of the self-vehicle X to the target spot S8 is shown in FIG. 47. Further, since the travel risk value R at the target spot S9 is equal to that at the target spot S8, the travel plan correction unit 15 may correct the travel plan so as to cause the self-vehicle X to move to the target spot S9.

D-3. Effects

According to the travel plan correction device 104 of the fourth preferred embodiment, the information acquisition unit 11 acquires the relative position of the self-vehicle X with respect to the surrounding vehicles by using the traffic information, and the risk calculation section setting unit 12 sets the range where the surrounding vehicle whose relative position with respect to the self-vehicle X is acquired by the information acquisition unit 11 using the traffic information is present, as the risk calculation section. Therefore, it is possible to set the risk calculation section in a range wider than that of the second preferred embodiment.

E. Hardware Configuration

Figure 48:
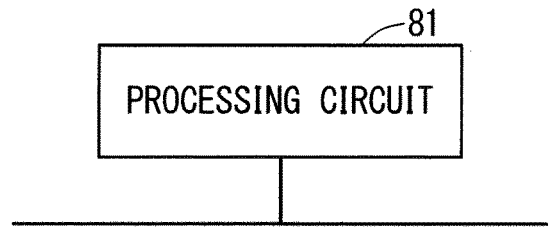
FIG. 48 is a hardware configuration diagram of the travel plan correction device in accordance with the present invention.

In the above-described travel plan correction devices 101, 102, 103, and 104, the information acquisition unit 11, the risk calculation section setting unit 12, the risk calculation unit 13, the risk reduction section extraction unit 14, the travel plan correction unit 15, the output control unit 16, and the movement recommendation value calculation unit 17 are implemented by a processing circuit 81 shown in FIG. 48. In other words, the processing circuit 81 comprises the information acquisition unit 11, the risk calculation section setting unit 12, the risk calculation unit 13, the risk reduction section extraction unit 14, the travel plan correction unit 15, the output control unit 16, and the movement recommendation value calculation unit 17 (hereinafter, referred to as "the information acquisition unit 11 and the like"). To the processing circuit 81, a dedicated hardware may be applied, or a processor which executes a program stored in a memory may be applied. As the processor, for example, used is a central processing unit, a processing unit, an arithmetic unit, a microprocessor, a microcomputer, a DSP (Digital Signal Processor), or the like.

When the processing circuit 81 is a dedicated hardware, the processing circuit 81 corresponds to, for example, a single circuit, a complex circuit, a programmed processor, a multiple programmed processor, an ASIC (Application Specific Integrated Circuit), an FPGA (Field Programmable Gate Array), or a combination of these circuits. Respective functions of the constituent elements such as the information acquisition unit 11 and the like may be implemented by a plurality of processing circuits 81, or these functions of the constituent elements may be collectively implemented by one processing circuit.

Figure 49:
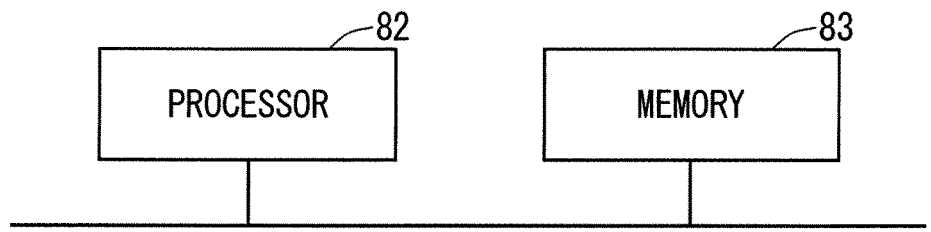
FIG. 49 is a hardware configuration diagram of the travel plan correction device in accordance with the present invention.

When the processing circuit 81 is a processor, the functions of the information acquisition unit 11 and the like are implemented by combination with software or the like (software, firmware, or software and firmware). The software or the like is described as a program and stored in a memory. As shown in FIG. 49, a processor 82 applied to the processing circuit 81 reads and executes the program stored in a memory 83, to thereby implement the respective functions of the constituent elements. Specifically, the travel plan correction devices 101, 102, 103, and 104 each comprise the memory 83 which stores therein programs which are executed by the processing circuit 81 to consequently perform the step of acquiring the relative position of the self-vehicle X with respect to the surrounding vehicle, the travel control information of the surrounding vehicle, and the travel plan, the step of setting the risk calculation section which has a certain relative positional relation with the traveling spot S1 in a case where the self-vehicle X travels along the travel plan and includes the traveling spot S1, the step of calculating the travel risk value indicating a risk at the time when the self-vehicle travels each of a plurality of target areas within the risk calculation section including the traveling spot S1, on the basis of the relative position between the target area and the surrounding vehicle and the travel control information of the surrounding vehicle, the step of extracting a section whose travel risk value R is lower than that at the traveling spot S1, out of the risk calculation section, as the risk reduction section, and the step of correcting the travel plan so as to cause the self-vehicle X to move to the risk reduction section. In other words, the program is executed to cause a computer to perform a procedure or a method of the information acquisition unit 11 and the like. Herein, the memory 83 may be, for example, a nonvolatile or volatile semiconductor memory such as a RAM (Random Access Memory), a ROM (Read Only Memory), a flash memory, an EPROM (Erasable Programmable Read Only Memory), an EEPROM (Electrically Erasable Programmable Read Only Memory), or the like, a HDD (Hard Disk Drive), a magnetic disk, a flexible disk, an optical disk, a compact disk, a mini disk, or a DVD (Digital Versatile Disc) and a drive unit thereof, or the like, or every storage medium which can be used in the future.

The case has been described above where the respective functions of the information acquisition unit 11 and the like are implemented by one of hardware and software or the like. This is, however, only one exemplary case, and there may be a case where some part of the information acquisition unit 11 and the like is implemented by a dedicated hardware and the other part is implemented by software or the like. For example, there may be a case where the function of the information acquisition unit 11 is implemented by the processing circuit as the dedicated hardware and the respective functions of the constituent elements other than the information acquisition unit 11 are implemented when the processing circuit 81 as the processor 82 reads and executes the programs stored in the memory 83.

Thus, the processing circuit can implement the above-described functions by hardware, software or the like, or combination thereof.

Figure 50:
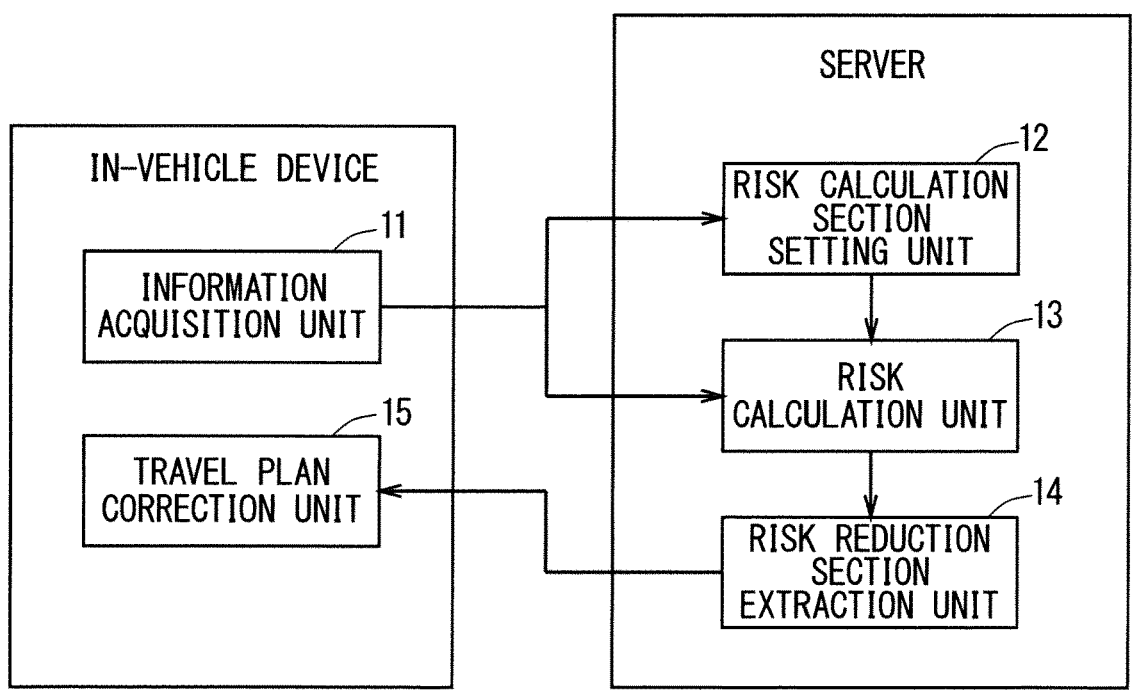
FIG. 50 is a configuration diagram of the travel plan correction device in accordance with the first preferred embodiment consisting of an in-vehicle device and a server.

Further, though it is assumed that the travel plan correction devices 101, 102, 103, and 104 are each an in-vehicle device in the above description, the above-described travel plan correction devices 101, 102, 103, and 104 can be each also applied to a system which is constructed as a system by combining, as appropriate, an in-vehicle device, a PND (Portable Navigation Device), a communication terminal (for example, a portable terminal such as a cellular phone, a smartphone, a tablet, or the like), an application function installed in these devices or terminals, and a server. In this case, the functions or the constituent elements in the above-described travel plan correction devices 101, 102, 103, and 104 may be arranged, being decentralized into these devices and terminals which constitute the system, or may be arranged, being centralized into any one device or terminal. As an example, the travel plan correction device 101 may be constituted of the in-vehicle device and the server, as shown in FIG. 50. In the exemplary case shown in FIG. 50, the information acquisition unit 11 and the travel plan correction unit 15 are included in the in-vehicle device, and the risk calculation section setting unit 12, the risk calculation unit 13, and the risk reduction section extraction unit 14 are included in the server.

In the present invention, the preferred embodiments and the variations may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

11 information acquisition unit, 12 risk calculation section setting unit, 13 risk calculation unit, 14 risk reduction section extraction unit, 15 travel plan correction unit, 16 output control unit, 17 movement recommendation value calculation unit, 21 inter-vehicle communication device, 22 in-vehicle sensor, 23 autonomous driving control device, 24 output device, 25 traffic information receiving device, 30 instrument panel, 31 fuel indicator, 32 speed indicator, 33 liquid crystal panel, 101, 102, 103, 104 travel plan correction device, 241 display device, 242 audio output device, 243 operation input device

The invention claimed is:

1. A travel plan correction device of a self-vehicle on which an autonomous driving control device performs travel control on the basis of a travel plan of the self-vehicle, comprising:
a processor to execute a program; and
a memory to store the program which, when executed by the processor, performs processes of,
acquiring a relative position of the self-vehicle with respect to a surrounding vehicle, travel control information of the surrounding vehicle, and the travel plan,
setting a risk calculation section which has a certain relative positional relation with a traveling spot in a case where the self-vehicle travels along the travel plan and includes the traveling spot,
calculating a travel risk value indicating a risk at the time when the self-vehicle travels each of a plurality of target areas within the risk calculation section including the traveling spot, on the basis of a relative position between the target area and the surrounding vehicle and the travel control information of the surrounding vehicle,
extracting a section whose travel risk value is lower than that at the traveling spot, out of the risk calculation section, as a risk reduction section,
correcting the travel plan so as to cause the self-vehicle to move to the risk reduction section,
correcting the travel plan so as to cause the self-vehicle to move to the risk reduction section even when there is a risk increase section whose travel risk value is higher than that at the traveling spot, between the traveling spot and the risk reduction section, and
calculating a movement recommendation value which is an index to be used to determine whether to move from the traveling spot to the risk reduction section,
wherein said travel plan correction device
determines whether to correct the travel plan so as to cause the self-vehicle to move to the risk reduction section, on the basis of the movement recommendation value, when the risk increase section is present between the traveling spot and the risk reduction section,
calculates, for each of all the risk reduction sections within the risk calculation section, a section movement recommendation value serving as an index to be used to determine whether to move to the risk reduction section through the risk increase section which is an immediately preceding section of the risk reduction section, and
sets an accumulated value obtained by accumulating the section movement recommendation values from the traveling spot to the risk reduction section as the movement recommendation value for the risk reduction section.

2. The travel plan correction device according to claim 1, wherein the travel plan correction device sets the section movement recommendation value on the basis of an integration value of differences each between the travel risk value in the risk increase section which is an immediately preceding section of the risk reduction section and the travel risk value at the traveling spot.

3. The travel plan correction device according to claim 1, wherein the travel plan correction device sets the section movement recommendation value on the basis of a maximum value of the travel risk value in the risk increase section which is an immediately preceding section of the risk reduction section.

4. The travel plan correction device according to claim 1, wherein the travel plan correction device sets the section movement recommendation value on the basis of an integration value of differences each between the travel risk value at the traveling spot and the travel risk value in the risk reduction section.

5. The travel plan correction device according to claim 1, wherein the travel plan correction device sets the section movement recommendation value on the basis of a minimum value of the travel risk value in the risk reduction section.

6. The travel plan correction device according to claim 1, wherein the travel plan correction device sets the section movement recommendation value for the risk reduction section which is a calculation target of the movement recommendation value, on the basis of a value obtained by integrating a difference between the travel risk value at the traveling spot and the minimum value of the travel risk value in the risk reduction section which is the calculation target, with a distance or time for which the self-vehicle travels after the self-vehicle moves to a spot at which the travel risk value for the risk reduction section which is the calculation target becomes the minimum value.

7. The travel plan correction device according to claim 1, wherein the travel control information of the surrounding vehicle includes control information on an steering actuator, a drive actuator, or a braking actuator of the surrounding vehicle.

8. The travel plan correction device according to claim 1, wherein
the travel plan correction device acquires the relative position of the self-vehicle with respect to the surrounding vehicle on the basis of detection information of a sensor mounted on the self-vehicle, and
the travel plan correction device sets a range in which the surrounding vehicle whose relative position with respect to the self-vehicle is acquired by using the sensor mounted on the self-vehicle is present, as the risk calculation section.

9. The travel plan correction device according to claim 8, wherein
the travel plan correction device acquires the relative position between the surrounding vehicle at a distant location which cannot be detected by the sensor and the self-vehicle by using traffic information, and
the travel plan correction device sets a range in which the surrounding vehicle whose relative position with respect to the self-vehicle is acquired by using the traffic information is present, as the risk calculation section.

10. The travel plan correction device according to claim 1, wherein
the program, when executed by the processor, performs further processes of:
causing an output device in the self-vehicle to output information indicating whether the risk reduction section is present or not.

11. The travel plan correction device according to claim 10, wherein the travel plan correction device causes the output device to output a graph indicating the risk values at the traveling spot and other areas in the risk calculation section.

12. The travel plan correction device according to claim 10, wherein
the output device is a display device, and
when the travel plan correction device corrects the travel plan so as to cause the self-vehicle to move to the risk reduction section, a presentation image of a moving path of the self-vehicle to the risk reduction section according to the corrected travel plan is displayed on the display device.

13. The travel plan correction device according to claim 12, wherein
the display device is a head up display, and
the travel plan correction device causes the head up display to display the travel control information of the surrounding vehicle while the travel control information of the surrounding vehicle is superimposed on a forward landscape of the self-vehicle.

14. A travel plan correction method of a self-vehicle on which an autonomous driving control device performs travel control on the basis of a travel plan of the self-vehicle, comprising:
acquiring a relative position of the self-vehicle with respect to a surrounding vehicle, travel control information of the surrounding vehicle, and the travel plan;
setting a risk calculation section which has a certain relative positional relation with a traveling spot in a case where the self-vehicle travels along the travel plan and includes the traveling spot;
calculating a travel risk value indicating a risk at the time when the self-vehicle travels each of a plurality of target areas within the risk calculation section including the traveling spot, on the basis of a relative position between the target area and the surrounding vehicle and the travel control information of the surrounding vehicle;
extracting a section whose travel risk value is lower than that at the traveling spot, out of the risk calculation section, as a risk reduction section;
correcting the travel plan so as to cause the self-vehicle to move to the risk reduction section; and
in the correcting of the travel plan, correcting the travel plan so as to cause the self-vehicle to move to the risk reduction section even when there is a risk increase section whose travel risk value is higher than that at the traveling spot, between the traveling spot and the risk reduction section,
calculating a movement recommendation value which is an index to be used to determine whether to move from the traveling spot to the risk reduction section,
determining whether to correct the travel plan so as to cause the self-vehicle to move to the risk reduction section, on the basis of the movement recommendation value, when the risk increase section is present between the traveling spot and the risk reduction section,
calculating, for each of all the risk reduction sections within the risk calculation section, a section movement recommendation value serving as an index to be used to determine whether to move to the risk reduction section through the risk increase section which is an immediately preceding section of the risk reduction section, and
setting an accumulated value obtained by accumulating the section movement recommendation values from the traveling spot to the risk reduction section as the movement recommendation value for the risk reduction section.

15. The travel plan correction device according to claim 12, wherein the presentation image is an image indicating a relative position between the moving path to the risk reduction section and the surrounding vehicle, as seen from above the self-vehicle.

16. A travel plan correction device of a self-vehicle on which an autonomous driving control device performs travel control on the basis of a travel plan of the self-vehicle, comprising:
a processor to execute a program; and
a memory to store the program which, when executed by the processor, performs processes of,
acquiring a relative position of the self-vehicle with respect to a surrounding vehicle, travel control information of the surrounding vehicle, and the travel plan,
setting a risk calculation section which has a certain relative positional relation with a traveling spot in a case where the self-vehicle travels along the travel plan and includes the traveling spot,
calculating a travel risk value indicating a risk at the time when the self-vehicle travels each of a plurality of target areas within the risk calculation section including the traveling spot, on the basis of a relative position between the target area and the surrounding vehicle and the travel control information of the surrounding vehicle,
extracting a section whose travel risk value is lower than that at the traveling spot, out of the risk calculation section, as a risk reduction section,
correcting the travel plan so as to cause the self-vehicle to move to the risk reduction section, wherein the travel control information of the surrounding vehicle includes information indicating whether the surrounding vehicle performs autonomous driving or manual driving or information indicating an autonomous driving level of the surrounding vehicle.

* * * * *